(12) United States Patent  
Mestres et al.

(10) Patent No.: US 11,348,148 B2  
(45) Date of Patent: May 31, 2022

(54) SYSTEMS AND METHODS FOR AN INTELLIGENT SOURCING ENGINE FOR STUDY PARTICIPANTS

(71) Applicant: Userzoom Technologies, Inc., Dover, DE (US)

(72) Inventors: Xavier Mestres, Barcelona (ES); Eduard Ponte, Barcelona (ES); Xavier Canchal, Barcelona (ES); Marc Anell, Barcelona (ES); David Matile, Barcelona (ES); Jorge Aboytes, Barcelona (ES); Roc Alayo, Barcelona (ES); Jordi Ibañez, Barcelona (ES)

(73) Assignee: USERZOOM TECHNOLOGIES, INC., Dover, DE (US)

( * ) Notice: Subject to any disclaimer, the term of this patent is extended or adjusted under 35 U.S.C. 154(b) by 89 days.

(21) Appl. No.: 17/063,368

(22) Filed: Oct. 5, 2020

(65) Prior Publication Data

US 2021/0090138 A1   Mar. 25, 2021

Related U.S. Application Data

(63) Continuation-in-part of application No. 16/730,954, filed on Dec. 30, 2019, now Pat. No. 11,068,374, and (Continued)

(51) Int. Cl.  
*G06Q 10/00* (2012.01)  
*G06Q 30/02* (2012.01)  
(Continued)

(52) U.S. Cl.  
CPC .......... *G06Q 30/0283* (2013.01); *G06N 5/04* (2013.01); *G06N 20/00* (2019.01)

(58) Field of Classification Search  
None  
See application file for complete search history.

(56) References Cited

U.S. PATENT DOCUMENTS 4,845,665 A   7/1989  Heath et al.  
5,086,393 A   2/1992  Kerr  
(Continued)

FOREIGN PATENT DOCUMENTS

WO   WO 2001024057   4/2001

OTHER PUBLICATIONS

Krzysztof Z. Gajos, Daniel S. Weld, Jacob O. Wobbrock et al. (Automatically generating personalized user interfaces with Supple, Artificial Intelligence 174 (2010) 910-950). (Year: 2010).*  
(Continued)

*Primary Examiner* — Hafiz A Kassim  
(74) *Attorney, Agent, or Firm* — Kang S. Lim

(57) ABSTRACT

Systems and methods for sourcing participants for a usability study are provided. In some embodiments the systems and methods receive study parameters including the type of study, time-to-field of the study, required number of participants, and required participant attributes. Additionally, a set of business rules for the study are received. These business rules may be received from a client, extrapolated from a service contract with a client for which the study is being performed, or generated based on the monitored outcomes of sourcing of previous studies. Next, panel sources for potential participants and pricing data are queried, and a set of the sources are selected based upon the pricing data. Participants are then received from these sources, which are then fielded in the study and monitored for outcomes.

20 Claims, 20 Drawing Sheets

Related U.S. Application Data a continuation-in-part of application No. 16/730,957, filed on Dec. 30, 2019, and a continuation-in-part of application No. 13/112,792, filed on May 20, 2011, now Pat. No. 10,691,583.

(60) Provisional application No. 62/913,142, filed on Oct. 9, 2019, provisional application No. 62/799,646, filed on Jan. 31, 2019, provisional application No. 61/348,431, filed on May 26, 2010.

(51) Int. Cl.
*G06N 5/04* (2006.01)
*G06N 20/00* (2019.01)

(56) References Cited

U.S. PATENT DOCUMENTS

| | | | |
|---|---|---|---|
| 5,220,658 A | 6/1993 | Kerr | |
| 5,724,262 A | 3/1998 | Ghahramani | |
| 5,808,908 A | 9/1998 | Ghahramani | |
| 6,237,138 B1 | 5/2001 | Hameluck | |
| 6,526,392 B1* | 2/2003 | Dietrich | G06Q 10/06 705/400 |
| 6,526,526 B1 | 2/2003 | Dong | |
| 6,738,082 B1 | 5/2004 | Dong et al. | |
| 6,859,784 B1* | 2/2005 | van Duyne | G06Q 30/02 463/40 |
| 6,895,437 B1 | 5/2005 | Cowdrey | |
| 7,222,078 B2 | 5/2007 | Abelow | |
| 7,587,484 B1 | 9/2009 | Smith | |
| 7,941,525 B1 | 5/2011 | Yavilevich | |
| 8,170,971 B1* | 5/2012 | Wilson | G06N 5/04 455/457 |
| 8,892,543 B1 | 11/2014 | Kapoor | |
| 2001/0049084 A1 | 12/2001 | Mitry | |
| 2002/0069079 A1* | 6/2002 | Vega | G06Q 50/188 705/80 |
| 2002/0103664 A1* | 8/2002 | Olsson | G06Q 30/0601 709/224 |
| 2002/0143931 A1 | 10/2002 | Smith | |
| 2002/0178163 A1 | 11/2002 | Mayer | |
| 2002/0194053 A1 | 12/2002 | Barrett | |
| 2002/0196277 A1 | 12/2002 | Bushey | |
| 2003/0028642 A1* | 2/2003 | Agarwal | G06F 9/5055 709/224 |
| 2003/0036944 A1* | 2/2003 | Lesandrini | G06Q 30/0273 705/7.29 |
| 2003/0046057 A1 | 3/2003 | Okunishi | |
| 2003/0191795 A1* | 10/2003 | Bernardin | G06F 9/505 709/201 |
| 2004/0015867 A1* | 1/2004 | Macko | G06F 11/3696 717/125 |
| 2004/0122943 A1* | 6/2004 | Error | H04L 67/02 709/224 |
| 2004/0177002 A1 | 9/2004 | Abelow | |
| 2004/0210661 A1* | 10/2004 | Thompson | H04L 67/306 709/228 |
| 2005/0182663 A1* | 8/2005 | Abraham-Fuchs | G06Q 30/02 705/3 |
| 2005/0254775 A1 | 11/2005 | Hamilton | |
| 2006/0184917 A1 | 8/2006 | Troan | |
| 2006/0242154 A1* | 10/2006 | Rawat | G06F 16/168 |
| 2007/0209010 A1 | 9/2007 | West | |
| 2008/0313149 A1 | 12/2008 | Li | |
| 2008/0313617 A1 | 12/2008 | Zhu | |
| 2008/0313633 A1 | 12/2008 | Zhu | |
| 2009/0138292 A1 | 5/2009 | Dusi | |
| 2009/0204267 A1* | 8/2009 | Sustaeta | G06Q 10/04 700/36 |
| 2009/0204573 A1 | 8/2009 | Neuneier | |
| 2009/0271788 A1 | 10/2009 | Holt | |
| 2009/0281819 A1 | 11/2009 | Garg | |
| 2009/0281852 A1 | 11/2009 | Abhari et al. | |
| 2010/0004951 A1 | 1/2010 | Alves et al. | |
| 2010/0030792 A1 | 2/2010 | Swinton et al. | |
| 2010/0083130 A1* | 4/2010 | Ol | G06F 3/14 715/744 |
| 2010/0095208 A1 | 4/2010 | White et al. | |
| 2010/0114666 A1* | 5/2010 | Brierley | G06Q 10/0639 705/14.19 |
| 2010/0121684 A1* | 5/2010 | Morio | G06Q 30/02 707/687 |
| 2010/0205541 A1* | 8/2010 | Rapaport | G06Q 30/02 715/753 |
| 2010/0251291 A1 | 9/2010 | Pino, Jr. et al. | |
| 2010/0332582 A1* | 12/2010 | Chen | G06F 9/5027 709/202 |
| 2011/0069821 A1* | 3/2011 | Korolev | H04M 3/5141 379/265.09 |
| 2011/0166884 A1 | 7/2011 | Lesselroth | |
| 2011/0208822 A1* | 8/2011 | Rathod | G06Q 30/02 709/206 |
| 2011/0307340 A1 | 12/2011 | Benmbarek | |
| 2011/0314092 A1 | 12/2011 | Lunt et al. | |
| 2012/0041838 A1* | 2/2012 | Serbanescu | G06Q 30/0641 705/26.4 |
| 2012/0072232 A1* | 3/2012 | Frankham | G16H 10/20 705/2 |
| 2012/0078660 A1 | 3/2012 | Mangicaro | |
| 2012/0210209 A1 | 8/2012 | Biddle | |
| 2013/0132833 A1 | 5/2013 | White | |
| 2013/0254735 A1 | 9/2013 | Sakhardande | |
| 2014/0052853 A1 | 2/2014 | Mestres | |
| 2014/0189054 A1 | 7/2014 | Snider et al. | |
| 2016/0217481 A1 | 7/2016 | Pastore | |
| 2017/0228745 A1 | 8/2017 | Garcia et al. | |

OTHER PUBLICATIONS

Jason I. Hong, Jeffrey Heer, Sarah Waterson, and James A. Landay (WebQuilt: A Proxy-based Approach to Remote Web Usability Testing, ACM Transactions on Information Systems, vol. 19, No. 3, Jul. 2001, pp. 263-285). (Year: 2001).*

Marco Comerio et al. (Web Service Contracts: Specification, Selection and Composition, Ph.D. Dissertation)). (Year: 2008).*

User-Centred Library Websites: Usability Evaluation Methods by Carole George, Edition:2008.

Richard Atterer, Monika Wnuk, and Albrecht Schmidt (Knowing the User's Every Move-User Activity Tracking for Website Usability Evaluation and Implicit Interaction, International World Wide Web Conference Committee, May 23-26, 2006, Edinburgh, Scotland). (Year:2006).

ISA/US, "Notification of Transmittal of the ISR and the Written Opinion of the International Searching Authority, or the Declaration," in PCT Application No. PCT/US2020/012218, May 28, 2020, 9 pages.

ISA/US, "Notification of Transmittal of the ISR and the Written Opinion of the International Searching Authority, or the Declaration," in PCT Application No. PCT/US2020/054439, Feb. 8, 2021, 8 pages.

* cited by examiner

SYSTEMS AND METHODS FOR AN INTELLIGENT SOURCING ENGINE FOR STUDY PARTICIPANTS

CROSS REFERENCE TO RELATED APPLICATIONS

This non-provisional application claims priority to U.S. Provisional Application No. 62/913,142, filed on Oct. 9, 2019, of the same title.

This application is also a continuation-in-part application and claims priority to U.S. application Ser. No. 13/112,792filed on May 20, 2011, entitled "System and Method for Unmoderated Remote User Testing and Card Sorting", now U.S. Pat. No. 10,691,583, issued Jun. 23, 2020, which application claims priority to U.S. Provisional Application No. 61/348,431, filed on May 26, 2010, of the same title.

This application is additionally a continuation-in-part application and claims priority to U.S. application Ser. No. 16/730,954, entitled "Generation, Administration and Analysis of User Experience Testing" and U.S. application Ser. No. 16/730,957, entitled "Advanced Analysis of Online User Experience Studies", both filed on Dec. 30, 2019 & pending, which applications claim priority to U.S. Provisional Application No. 62/799,646, entitled "Systems and Methods for the Generation, Administration and Analysis of User Experience Testing", filed on Jan. 31, 2019.

All of the above-listed applications/patents are incorporated herein in their entirety by this reference.

BACKGROUND

The present invention relates to systems and methods for the AI assisted analysis of user experience studies that allow for insight generation for the usability of a website. Generally, this type of testing is referred to as "User Experience" or merely "UX" testing.

The Internet provides new opportunities for business entities to reach customers via web sites that promote and describe their products or services. Often, the appeal of a web site and its ease of use may affect a potential buyer's decision to purchase the product/service.

Especially as user experiences continue to improve and competition online becomes increasingly aggressive, the ease of use by a particular retailer's website may have a material impact upon sales performance. Unlike a physical shopping experience, there is minimal hurdles to a user going to a competitor for a similar service or good. Thus, in addition to traditional motivators (e.g., competitive pricing, return policies, brand reputation, etc.) the ease of a website to navigate is of paramount importance to a successful online presence.

As such, assessing the appeal, user friendliness, and effectiveness of a web site is of substantial value to marketing managers, web site designers and user experience specialists; however, this information is typically difficult to obtain. Focus groups are sometimes used to achieve this goal but the process is long, expensive and not reliable, in part, due to the size and demographics of the focus group that may not be representative of the target customer base.

In more recent years advances have been made in the automation and implementation of mass online surveys for collecting user feedback information. Typically these systems include survey questions, or potentially a task on a website followed by feedback requests. While such systems are useful in collecting some information regarding user experiences, the studies often suffer from biases in responses, and limited types of feedback collected.

In order to overcome these limitations, systems and methods have been developed to provide more immersive user experience testing which utilize AI analytics, audio and video recording, and improved interfaces. These systems and methods have revolutionized user experience testing, but still fundamentally rely upon the ability to recruit sufficient numbers of qualified and interested participants.

Sourcing capable participants is always a challenge, and becomes particularly difficult when very large studies are performed, or many studies are operating in parallel. Traditionally, companies would solicit individuals to join focus groups. Such methods were generally effective in collecting small groups of willing participants, but are extremely resource intensive, and fail to scale in any appreciable manner. With the invention of the internet, more individuals could be solicited in a much more cost effective manner. These populations are aggregated by survey provider groups, and can serve as a source for willing participants. However, even these large participant pooling companies are generally unable to fulfill the needs of truly scaled UX studies. Additionally these pooled participant sources often are unable to properly deliver the quality of participants desired.

It is therefore apparent that an urgent need exists for advancements in the sourcing of participants for user experience studies. Such systems and methods allow for modified participant sourcing based upon pricing structure, and allow for consistent and qualified participant sourcing.

SUMMARY

To achieve the foregoing and in accordance with the present invention, systems and methods for participant sourcing for user experience studies is provided. An intelligent sourcing engine is capable of delivering qualified and scalable numbers of participants for large, complex and multiple parallel user experience studies in a manner not available previously.

The methods and systems for sourcing participants for a usability study first receives study parameters including the type of study, time-to-field of the study, required number of participants, and required participant attributes. Additionally, a set of business rules for the study are received. These business rules may be received from a client, extrapolated from a service contract with a client for which the study is being performed, or generated based on the monitored outcomes of sourcing of previous studies.

Next, panel sources for potential participants and pricing data are queried, and a set of the sources are selected based upon the pricing data. Participants are then received from these sources, which are then fielded in the study and monitored for outcomes.

In some cases, the panel sources are filtered for a minimum quality threshold. This is based on quality metric for each panel source which is generated by prior participation in studies responsive to timing of study tasks, red herring questions, answer consistency and answer patterns.

Panel selection may include determining the available number of participants in each panel source, calculating a pool size based upon participants which historically have engaged in the type of study and within the time-to-field of the study, ranking plurality of panel sources by the pricing data, and comparing the pool size of each panel source to the required number of participants in order of the ranking. The available number of participants in each panel source is determined using participant attributes, which can be targetable or non-targetable.

Based upon participant joining rates, the invitation numbers may be increased or throttled. Likewise, costs/price may be adjusted based upon participant join rates.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which.

DETAILED DESCRIPTION

Figure 1A:
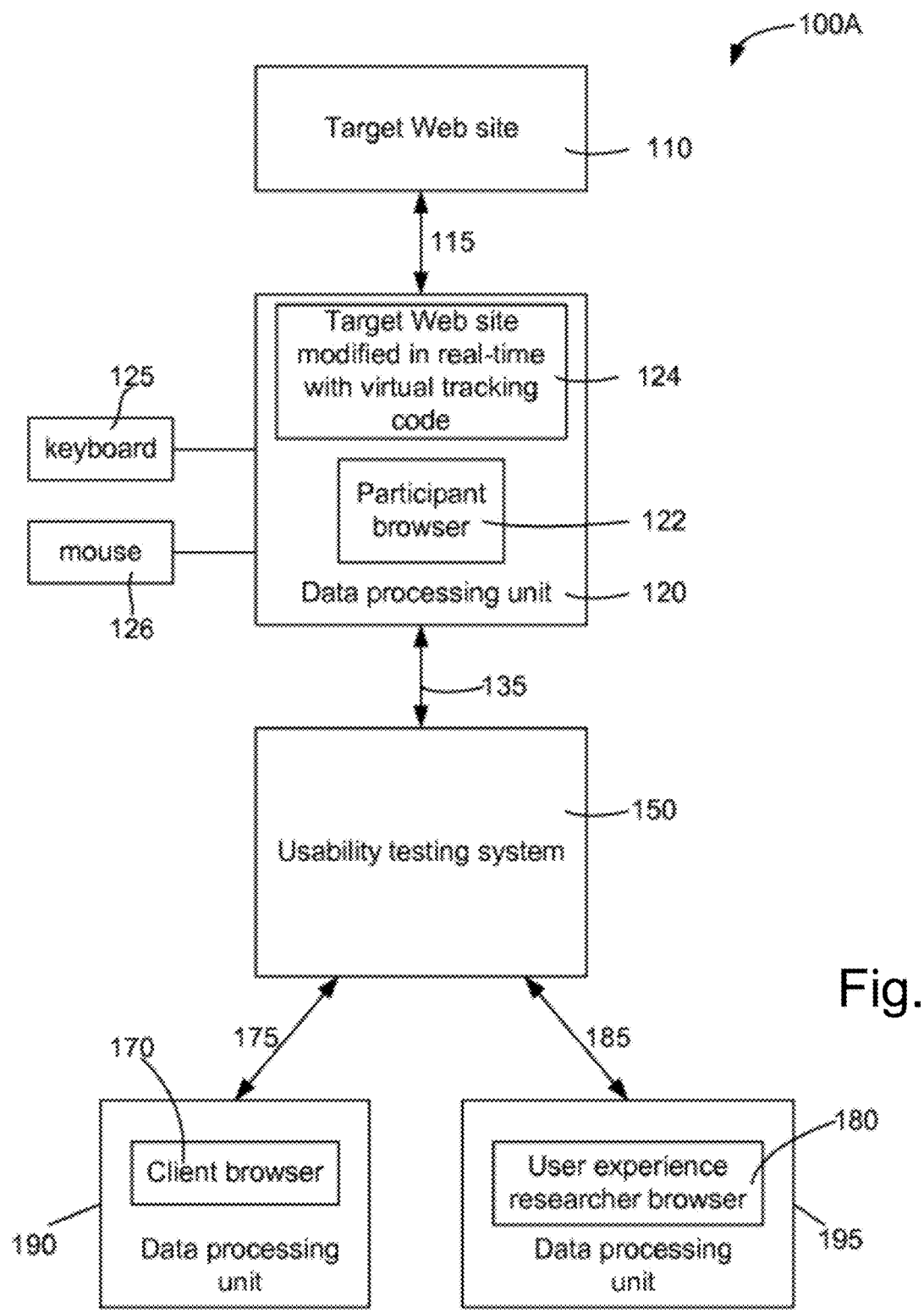
FIG. 1A is an example logical diagram of a system for user experience studies, in accordance with some embodiment.

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "will," "will not," "shall," "shall not," "must," "must not," "first," "initially," "next," "subsequently," "before," "after," "lastly," and "finally," are not meant to limit the scope of the present invention as the embodiments disclosed herein are merely exemplary.

The present invention relates to the sourcing of participants for user experience testing and subsequent insight generation. While such systems and methods may be utilized with any user experience environment, embodiments described in greater detail herein are directed to providing participants for user experience studies in an online/webpage environment. Some descriptions of the present systems and methods will also focus nearly exclusively upon the user experience within a retailer's website. This is intentional in order to provide a clear use case and brevity to the disclosure, however it should be noted that the present systems and methods apply equally well to any situation where a user experience in an online platform is being studied. As such, the focus herein on a retail setting is in no way intended to artificially limit the scope of this disclosure.

In the following it is understood that the term 'usability' refers to a metric scoring value for judging the ease of use of a target web site. A 'client' refers to a sponsor who initiates and/or finances the usability study. The client may be, for example, a marketing manager who seeks to test the usability of a commercial web site for marketing (selling or advertising) certain products or services. ' Participants' may be a selected group of people who participate in the usability study and may be screened based on a predetermined set of questions. 'UX researcher' or 'UX designer' refers to an individual generating or collecting information on usability via a study. A 'Project manager' or 'Marketing Manager' are generally client employees tasked with determining the usability of a product or website. These individuals may author a study directly, or leverage a UX researcher to author a usability study. 'Remote usability testing' or 'remote usability study' refers to testing or study in accordance with which participants (referred to use their computers, mobile devices or otherwise) access a target web site in order to provide feedback about the web site's ease of use, connection speed, and the level of satisfaction the participant experiences in using the web site. 'Unmoderated usability testing' refers to communication with test participants without a moderator, e.g., a software, hardware, or a combined software/hardware system can automatically gather the participants' feedback and records their responses. The system can test a target web site by asking participants to view the web site, perform test tasks, and answer questions associated with the tasks.

To facilitate the discussion, FIG. 1 is a simplified block diagram of a user testing platform 100A according to an embodiment. Platform 100A is adapted to test a target web site 110. Platform 100A is shown as including a usability testing system 150 that is in communications with data processing units 120, 190 and 195. Data processing units 120, 190 and 195 may be a personal computer equipped with a monitor, a handheld device such as a tablet PC, an electronic notebook, a wearable device such as a cell phone, or a smart phone.

Data processing unit 120 includes a browser 122 that enables a user (e.g., usability test participant) using the data processing unit 120 to access target web site 110. Data processing unit 120 includes, in part, an input device such as a keyboard 125 or a mouse 126, and a participant browser 122. In one embodiment, data processing unit 120 may insert a virtual tracking code to target web site 110 in real-time while the target web site is being downloaded to the data processing unit 120. The virtual tracking code may be a proprietary JavaScript code, whereby the run-time data processing unit interprets the code for execution. The tracking code collects participants' activities on the downloaded web page such as the number of clicks, key strokes, keywords, scrolls, time on tasks, and the like over a period of time. Data processing unit 120 simulates the operations performed by the tracking code and is in communication with usability testing system 150 via a communication link 135. Communication link 135 may include a local area network, a metropolitan area network, and a wide area network. Such a communication link may be established through a physical wire or wirelessly. For example, the communication link may be established using an Internet protocol such as the TCP/IP protocol.

Activities of the participants associated with target web site 110 are collected and sent to usability testing system 150 via communication link 135. In one embodiment, data processing unit 120 may instruct a participant to perform predefined tasks on the downloaded web site during a usability test session, in which the participant evaluates the web site based on a series of usability tests. The virtual tracking code (e.g., a proprietary JavaScript) may record the participant's responses (such as the number of mouse clicks) and the time spent in performing the predefined tasks. Screenshots, video and/or audio recordings, interactions with a specific interface, and touch data may also be collected based upon the study criteria. The usability testing may also include gathering performance data of the target web site such as the ease of use, the connection speed, the satisfaction of the user experience. Because the web page is not modified on the original web site, but on the downloaded version in the participant data processing unit, the usability can be tested on any web sites including competitions' web sites.

Data collected by data processing unit 120 may be sent to the usability testing system 150 via communication link 135. In an embodiment, usability testing system 150 is further accessible by a client via a client browser 170 running on data processing unit 190. Usability testing system 150 is further accessible by user experience researcher browser 180 running on data processing unit 195. Client browser 170 is shown as being in communications with usability testing system 150 via communication link 175. User experience research browser 180 is shown as being in communications with usability testing system 150 via communications link 185. A client and/or user experience researcher may design one or more sets of questionnaires for screening participants and for testing the usability of a web site. Usability testing system 150 is described in detail below.

Figure 1B:
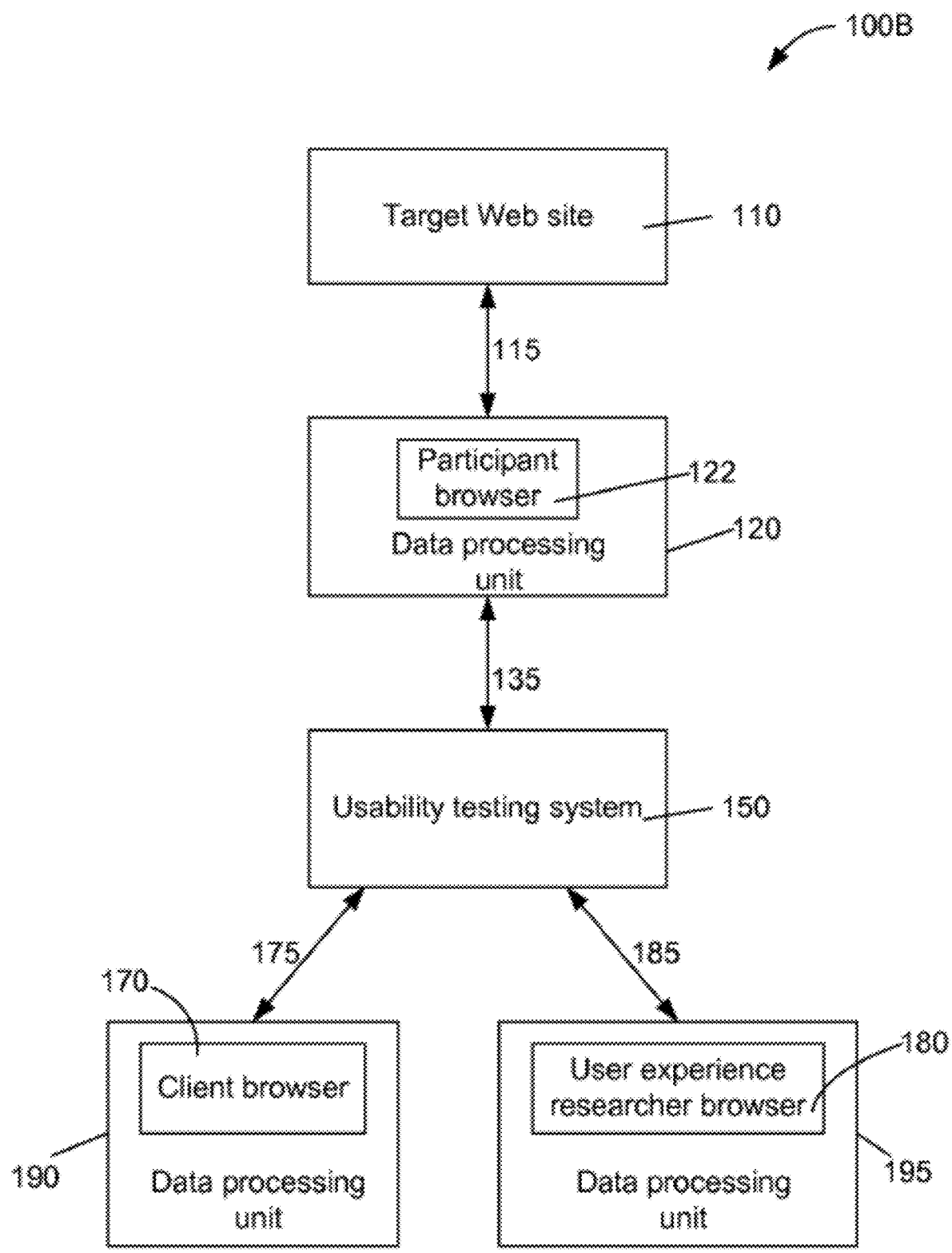
FIG. 1B is a second example logical diagram of a system for user experience studies, in accordance with some embodiment.

FIG. 1B is a simplified block diagram of a user testing platform 100B according to another embodiment of the present invention. Platform 100B is shown as including a target web site 110 being tested by one or more participants using a standard web browser 122 running on data processing unit 120 equipped with a display. Participants may communicate with a usability test system 150 via a communication link 135. Usability test system 150 may communicate with a client browser 170 running on a data processing unit 190. Likewise, usability test system 150 may communicate with user experience researcher browser running on data processing unit 195. Although a data processing unit is illustrated, one of skill in the art will appreciate that data processing unit 120 may include a configuration of multiple single-core or multi-core processors configured to process instructions, collect usability test data (e.g., number of clicks, mouse movements, time spent on each web page, connection speed, and the like), store and transmit the collected data to the usability testing system, and display graphical information to a participant via an input/output device (not shown).

Figure 1C:
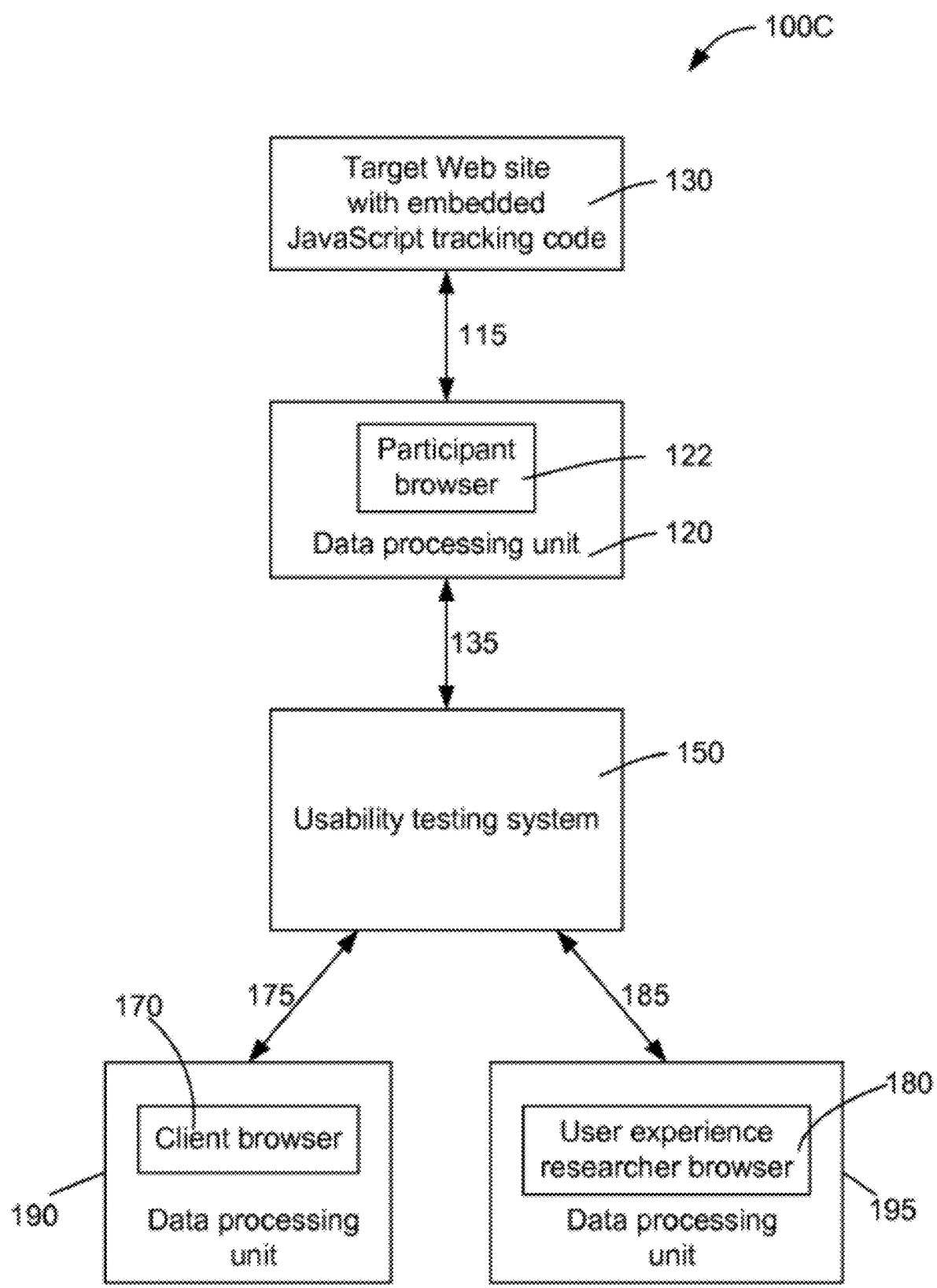
FIG. 1C is a third example logical diagram of a system for user experience studies, in accordance with some embodiment.

FIG. 1C is a simplified block diagram of a user testing platform 100C according to yet another embodiment of the present invention. Platform 100C is shown as including a target web site 130 being tested by one or more participants using a standard web browser 122 running on data processing unit 120 having a display. The target web site 130 is shown as including a tracking program code configured to track actions and responses of participants and send the tracked actions/responses back to the participant's data processing unit 120 through a communication link 115. Communication link 115 may be computer network, a virtual private network, a local area network, a metropolitan area network, a wide area network, and the like. In one embodiment, the tracking program is a JavaScript configured to run tasks related to usability testing and sending the test/study results back to participant's data processing unit for display. Such embodiments advantageously enable clients using client browser 170 as well as user experience researchers using user experience research browser 180 to design mockups or prototypes for usability testing of variety of web site layouts. Data processing unit 120 may collect data associated with the usability of the target web site and send the collected data to the usability testing system 150 via a communication link 135.

In one exemplary embodiment, the testing of the target web site (page) may provide data such as ease of access through the Internet, its attractiveness, ease of navigation, the speed with which it enables a user to complete a transaction, and the like. In another exemplary embodiment, the testing of the target web site provides data such as duration of usage, the number of keystrokes, the user's profile, and the like. It is understood that testing of a web site in accordance with embodiments of the present invention can provide other data and usability metrics. Information collected by the participant's data processing unit is uploaded to usability testing system 150 via communication link 135 for storage and analysis.

Figure 2:
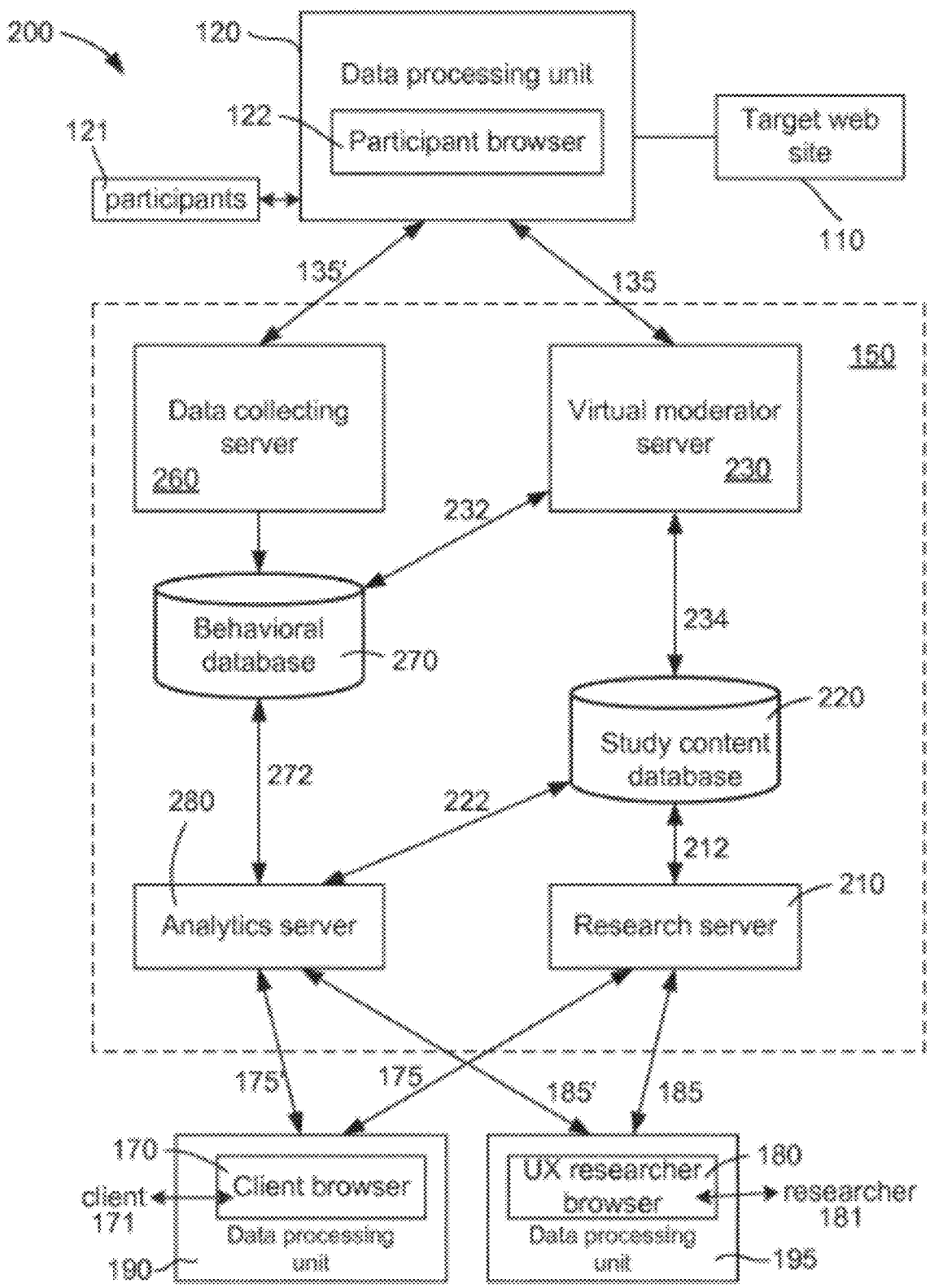
FIG. 2 is an example logical diagram of the usability testing system, in accordance with some embodiment.

FIG. 2 is a simplified block diagram of an exemplary embodiment platform 200 according to one embodiment of the present invention. Platform 200 is shown as including, in part, a usability testing system 150 being in communications with a data processing unit 125 via communications links 135 and 135'. Data processing unit 125 includes, in part, a participant browser 120 that enables a participant to access a target web site 110. Data processing unit 125 may be a personal computer, a handheld device, such as a cell phone, a smart phone or a tablet PC, or an electronic notebook. Data processing unit 125 may receive instructions and program codes from usability testing system 150 and display predefined tasks to participants 120. The instructions and program codes may include a web-based application that instructs participant browser 122 to access the target web site 110. In one embodiment, a tracking code is inserted to the target web site 110 that is being downloaded to data processing unit 125. The tracking code may be a JavaScript code that collects participants' activities on the downloaded target web site such as the number of clicks, key strokes, movements of the mouse, keywords, scrolls, time on tasks and the like performed over a period of time.

Data processing unit 125 may send the collected data to usability testing system 150 via communication link 135' which may be a local area network, a metropolitan area network, a wide area network, and the like and enable usability testing system 150 to establish communication with data processing unit 125 through a physical wire or wirelessly using a packet data protocol such as the TCP/IP protocol or a proprietary communication protocol.

Usability testing system 150 includes a virtual moderator software module running on a virtual moderator server 230 that conducts interactive usability testing with a usability test participant via data processing unit 125 and a research module running on a research server 210 that may be connected to a user research experience data processing unit 195. User experience researcher 181 may create tasks relevant to the usability study of a target web site and provide the created tasks to the research server 210 via a communication link 185. One of the tasks may be a set of questions designed to classify participants into different categories or to prescreen participants. Another task may be, for example, a set of questions to rate the usability of a target web site based on certain metrics such as ease of navigating the web site, connection speed, layout of the web page, ease of finding the products (e.g., the organization of product indexes). Yet another tasks may be a survey asking participants to press a "yes" or "no" button or write short comments about participants' experiences or familiarity with certain products and their satisfaction with the products. All these tasks can be stored in a study content database 220, which can be retrieved by the virtual moderator module running on virtual moderator server 230 to forward to participants 120. Research module running on research server 210 can also be accessed by a client (e.g., a sponsor of the usability test) 171 who, like user experience researchers 181, can design her own questionnaires since the client has a personal interest to the target web site under study.

Client 171 can work together with user experience researchers 181 to create tasks for usability testing. In an embodiment, client 171 can modify tasks or lists of questions stored in the study content database 220. In another embodiment, client 171 can add or delete tasks or questionnaires in the study content database 220. In yet another embodiment, client 171 may be user experience researcher 181.

In some embodiment, one of the tasks may be open or closed card sorting studies for optimizing the architecture and layout of the target web site. Card sorting is a technique that shows how online users organize content in their own mind. In an open card sort, participants create their own names for the categories. In a closed card sort, participants are provided with a predetermined set of category names. Client 171 and/or user experience researcher 181 can create proprietary online card sorting tool that executes card sorting exercises over large groups of participants in a rapid and cost-effective manner. In an embodiment, the card sorting exercises may include up to 100 items to sort and up to 12 categories to group. One of the tasks may include categorization criteria such as asking participants questions "why do you group these items like this?". Research module on research server 210 may combine card sorting exercises and online questionnaire tools for detailed taxonomy analysis. In an embodiment, the card sorting studies are compatible with SPSS applications.

In an embodiment, the card sorting studies can be assigned randomly to participant 120. User experience (UX) researcher 181 and/or client 171 may decide how many of those card sorting studies each participant is required to complete. For example, user experience researcher 181 may create a card sorting study within 12 tasks, group them in 4 groups of 3 tasks and manage that each participant just has to complete one task of each group.

After presenting the thus created tasks to participants 120 through virtual moderator module (running on virtual moderator serer 230) and communication link 135, the actions/responses of participants will be collected in a data collecting module running on a data collecting server 260 via a communication link 135'. In an embodiment, communication link 135' may be a distributed computer network and share the same physical connection as communication link 135. This is, for example, the case where data collecting module 260 locates physically close to virtual moderator module 230, or if they share the usability testing system's processing hardware. In the following description, software modules running on associated hardware platforms will have the same reference numerals as their associated hardware platform. For example, virtual moderator module will be assigned the same reference numeral as the virtual moderator server 230, and likewise data collecting module will have the same reference numeral as the data collecting server 260.

Data collecting module 260 may include a sample quality control module that screens and validates the received responses, and eliminates participants who provide incorrect responses, or do not belong to a predetermined profile, or do not qualify for the study. Data collecting module 260 may include a "binning" module that is configured to classify the validated responses and stores them into corresponding categories in a behavioral database 270.

Merely as an example, responses may include gathered web site interaction events such as clicks, keywords, URLs, scrolls, time on task, navigation to other web pages, and the like. In one embodiment, virtual moderator server 230 has access to behavioral database 270 and uses the content of the behavioral database to interactively interface with participants 120. Based on data stored in the behavioral database, virtual moderator server 230 may direct participants to other pages of the target web site and further collect their interaction inputs in order to improve the quantity and quality of the collected data and also encourage participants' engagement. In one embodiment, virtual moderator server may eliminate one or more participants based on data collected in the behavioral database. This is the case if the one or more participants provide inputs that fail to meet a predetermined profile.

Usability testing system 150 further includes an analytics module 280 that is configured to provide analytics and reporting to queries coming from client 171 or user experience (UX) researcher 181. In an embodiment, analytics module 280 is running on a dedicated analytics server that offloads data processing tasks from traditional servers. Analytics server 280 is purpose-built for analytics and reporting and can run queries from client 171 and/or user experience researcher 181 much faster (e.g., 100 times faster) than conventional server system, regardless of the number of clients making queries or the complexity of queries. The purpose-built analytics server 280 is designed for rapid query processing and ad hoc analytics and can deliver higher performance at lower cost, and, thus provides a competitive advantage in the field of usability testing and reporting and allows a company such as UserZoom (or Xperience Consulting, SL) to get a jump start on its competitors.

In an embodiment, research module 210, virtual moderator module 230, data collecting module 260, and analytics server 280 are operated in respective dedicated servers to provide higher performance. Client (sponsor) 171 and/or user experience research 181 may receive usability test reports by accessing analytics server 280 via respective links 175' and/or 185'. Analytics server 280 may communicate with behavioral database via a two-way communication link 272.

In an embodiment, study content database 220 may include a hard disk storage or a disk array that is accessed via iSCSI or Fiber Channel over a storage area network. In an embodiment, the study content is provided to analytics server 280 via a link 222 so that analytics server 280 can retrieve the study content such as task descriptions, question texts, related answer texts, products by category, and the like, and generate together with the content of the behavioral database 270 comprehensive reports to client 171 and/or user experience researcher 181.

Shown in FIG. 2 is a connection 232 between virtual moderator server 230 and behavioral database 270. Behavioral database 270 can be a network attached storage server or a storage area network disk array that includes a two-way communication via link 232 with virtual moderator server 230. Behavioral database 270 is operative to support virtual moderator server 230 during the usability testing session. For example, some questions or tasks are interactively presented to the participants based on data collected. It would be advantageous to the user experience researcher to set up specific questions that enhance the usability testing if participants behave a certain way. If a participant decides to go to a certain web page during the study, the virtual moderator server 230 will pop up corresponding questions related to that page; and answers related to that page will be received and screened by data collecting server 260 and categorized in behavioral database server 270. In some embodiments, virtual moderator server 230 operates together with data stored in the behavioral database to proceed the next steps. Virtual moderator server, for example, may need to know whether a participant has successfully completed a task, or based on the data gathered in behavioral database 270, present another tasks to the participant.

Referring still to FIG. 2, client 171 and user experience researcher 181 may provide one or more sets of questions associated with a target web site to research server 210 via respective communication link 175 and 185. Research server 210 stores the provided sets of questions in a study content database 220 that may include a mass storage device, a hard disk storage or a disk array being in communication with research server 210 through a two-way interconnection link 212. The study content database may interface with virtual moderator server 230 through a communication link 234 and provides one or more sets of questions to participants via virtual moderator server 230.

Figure 3A:
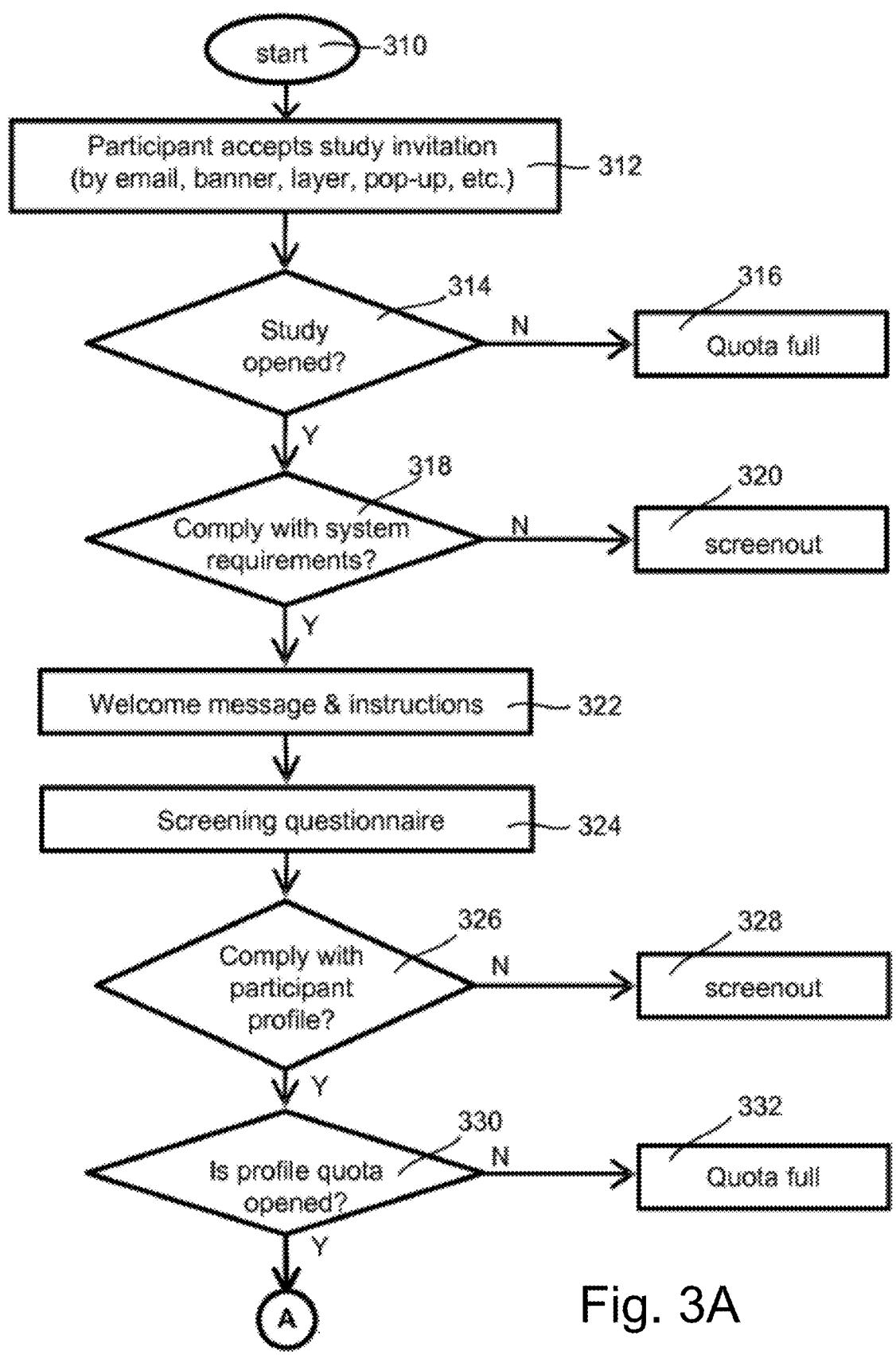
FIG. 3A is a flow diagram illustrating an exemplary process of interfacing with potential candidates and pre-screening participants for the usability testing according to an embodiment of the present invention.

FIG. 3A is a flow diagram of an exemplary process of interfacing with potential candidates and prescreening participants for the usability testing according to one embodiment of the present invention. The process starts at step 310. Initially, potential candidates for the usability testing may be recruited by email, advertisement banners, pop-ups, text layers, overlays, and the like (step 312). The number of candidates who have accepted the invitation to the usability test will be determined at step 314. If the number of candidates reaches a predetermined target number, then other candidates who have signed up late may be prompted with a message thanking for their interest and that they may be considered for a future survey (shown as "quota full" in step 316). At step 318, the usability testing system further determines whether the participants' browser comply with a target web site browser, and whether the device, operating system, and peripherals meet the study requirements (e.g., a webcam of sufficient quality or a touch enabled device, for example). For example, user experience researchers or the client may want to study and measure a web site's usability with regard to a specific web browser (e.g., Microsoft Edge) and reject all other browsers. Or in other cases, only the usability data of a web site related to Opera or Chrome will be collected, and Microsoft Edge or FireFox will be rejected at step 320. At step 322, participants will be prompted with a welcome message and instructions are presented to participants that, for example, explain how the usability testing will be performed, the rules to be followed, and the expected duration of the test, and the like. At step 324, one or more sets of screening questions may be presented to collect profile information of the participants. Questions may relate to participants' experience with certain products, their awareness with certain brand names, their gender, age, education level, income, online buying habits, and the like. At step 326, the system further eliminates participants based on the collected information data. For example, only participants who have used the products under study will be accepted or screened out (step 328). At step 330, a quota for participants having a target profile will be determined. For example, half of the participants must be female, and they must have online purchase experience or have purchased products online in recent years.

Figure 3B:
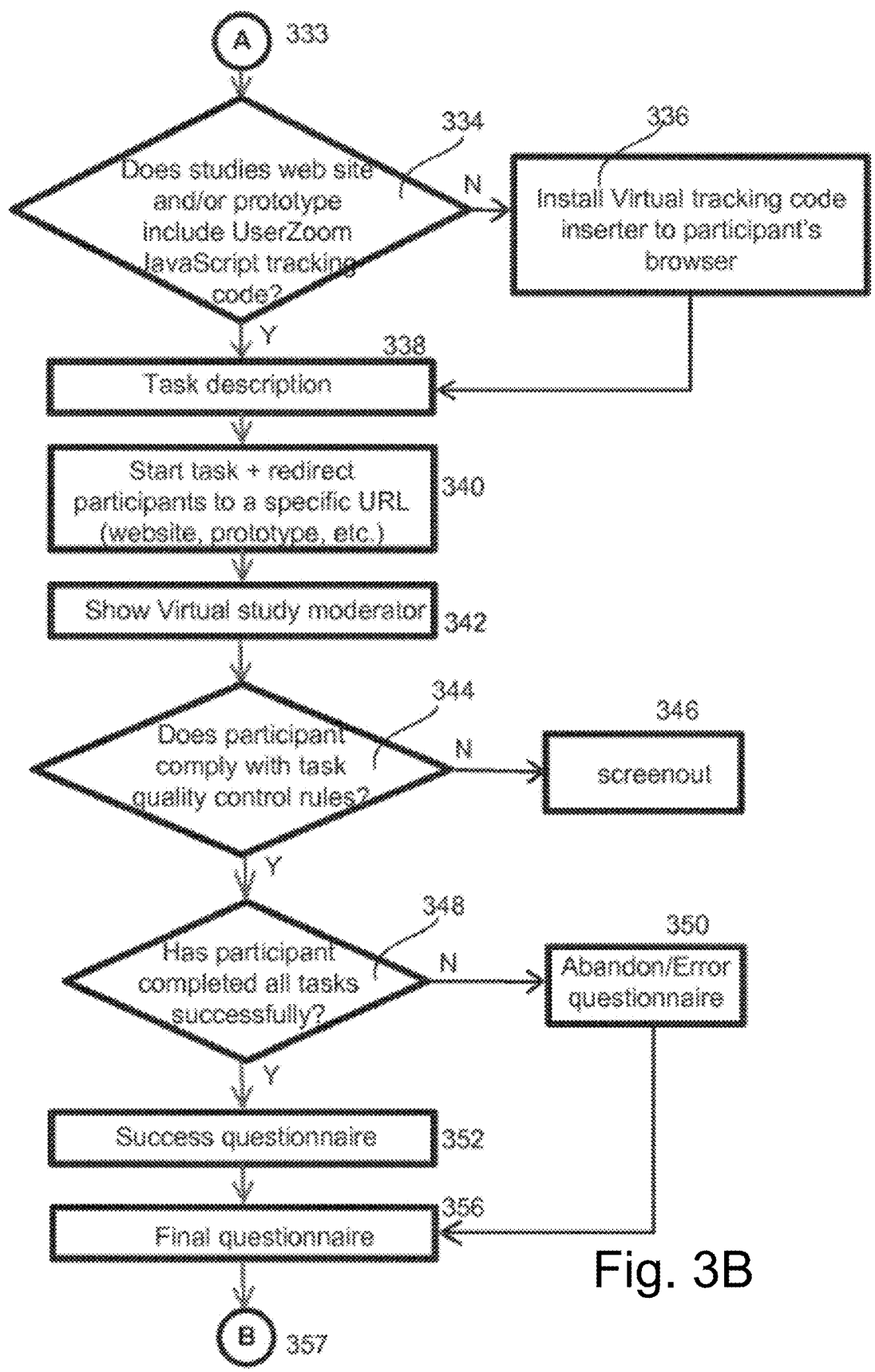
FIG. 3B is a flow diagram of an exemplary process for collecting usability data of a target web site according to an embodiment of the present invention.

FIG. 3B is a flow diagram of an exemplary process for gathering usability data of a target web site according to an embodiment of the present invention. At step 334, the target web site under test will be verified whether it includes a proprietary tracking code. In an embodiment, the tracking code is a UserZoom JavaScript code that pop-ups a series of tasks to the pre-screened participants. If the web site under study includes a proprietary tracking code (this corresponds to the scenario shown in FIG. 1C), then the process proceeds to step 338. Otherwise, a virtual tracking code will be inserted to participants' browser at step 336. This corresponds to the scenario described above in FIG. 1A.

The following process flow is best understood together with FIG. 2. At step 338, a task is described to participants. The task can be, for example, to ask participants to locate a color printer below a given price. At step 340, the task may redirect participants to a specific web site such as eBay, HP, or Amazon.com. The progress of each participant in performing the task is monitored by a virtual study moderator at step 342. At step 344, responses associated with the task are collected and verified against the task quality control rules. The step 344 may be performed by the data collecting module 260 described above and shown in FIG. 2. Data collecting module 260 ensures the quality of the received responses before storing them in a behavioral database 270 (FIG. 2). Behavioral database 270 may include data that the client and/or user experience researcher want to determine such as how many web pages a participant viewed before selecting a product, how long it took the participant to select the product and complete the purchase, how many mouse clicks and text entries were required to complete the purchase and the like. A number of participants may be screened out (step 346) during step 344 for non-complying with the task quality control rules and/or the number of participants may be required to go over a series of training provided by the virtual moderator module 230. At step 348, virtual moderator module 230 determines whether or not participants have completed all tasks successfully. If all tasks are completed successfully (e.g., participants were able to find a web page that contains the color printer under the given price), virtual moderator module 230 will prompt a success questionnaire to participants at step 352. If not, then virtual moderator module 230 will prompt an abandon or error questionnaire to participants who did not complete all tasks successfully to find out the causes that lead to the incompletion. Whether participants have completed all task successfully or not, they will be prompted a final questionnaire at step 356.

Figure 3C:
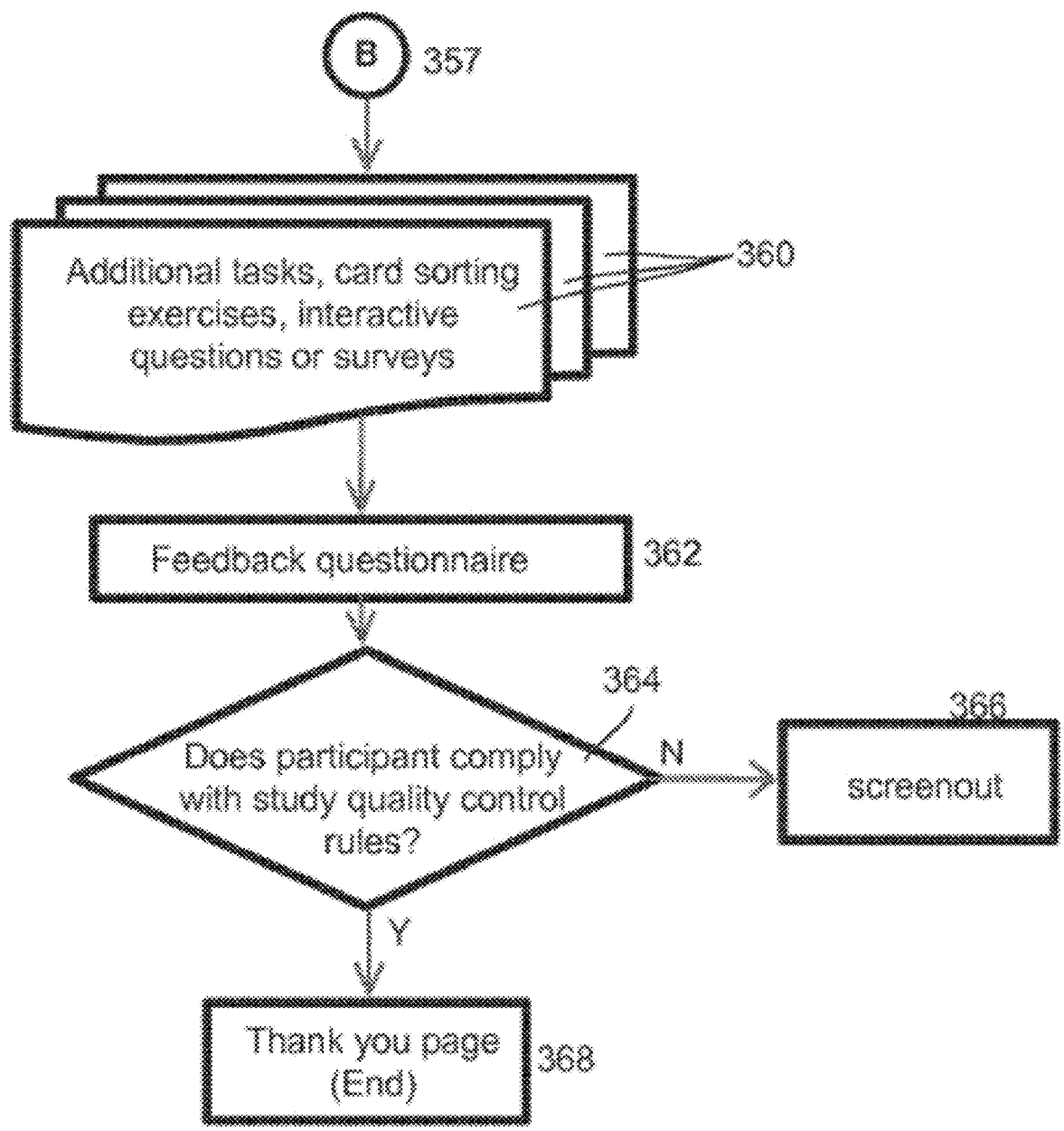
FIG. 3C is a flow diagram of an exemplary process for card sorting studies according to an embodiment of the present invention.

FIG. 3C is a flow diagram of an exemplary process for card sorting studies according to one embodiment of the present invention. At step 360, participants may be prompted with additional tasks such as card sorting exercises. Card sorting is a powerful technique for assessing how participants or visitors of a target web site group related concepts together based on the degree of similarity or a number of shared characteristics. Card sorting exercises may be time consuming. In an embodiment, participants will not be prompted all tasks but only a random number of tasks for the card sorting exercise. For example, a card sorting study is created within 12 tasks that is grouped in 6 groups of 2 tasks. Each participant just needs to complete one task of each group. It should be appreciated to one person of skill in the art that many variations, modifications, and alternatives are possible to randomize the card sorting exercise to save time and cost. Once the card sorting exercises are completed, participants are prompted with a questionnaire for feedback at step 362. The feedback questionnaire may include one or more survey questions such as a subjective rating of target web site attractiveness, how easy the product can be used, features that participants like or dislike, whether participants would recommend the products to others, and the like. At step 364, the results of the card sorting exercises will be analyzed against a set of quality control rules, and the qualified results will be stored in the behavioral database 270. In an embodiment, the analyze of the result of the card sorting exercise is performed by a dedicated analytics server 280 that provides much higher performance than general-purpose servers to provide higher satisfaction to clients. If participants complete all tasks successfully, then the process proceeds to step 368, where all participants will be thanked for their time and/or any reward may be paid out. Else, if participants do not comply or cannot complete the tasks successfully, the process proceeds to step 366 that eliminates the non-compliant participants.

Figure 4:
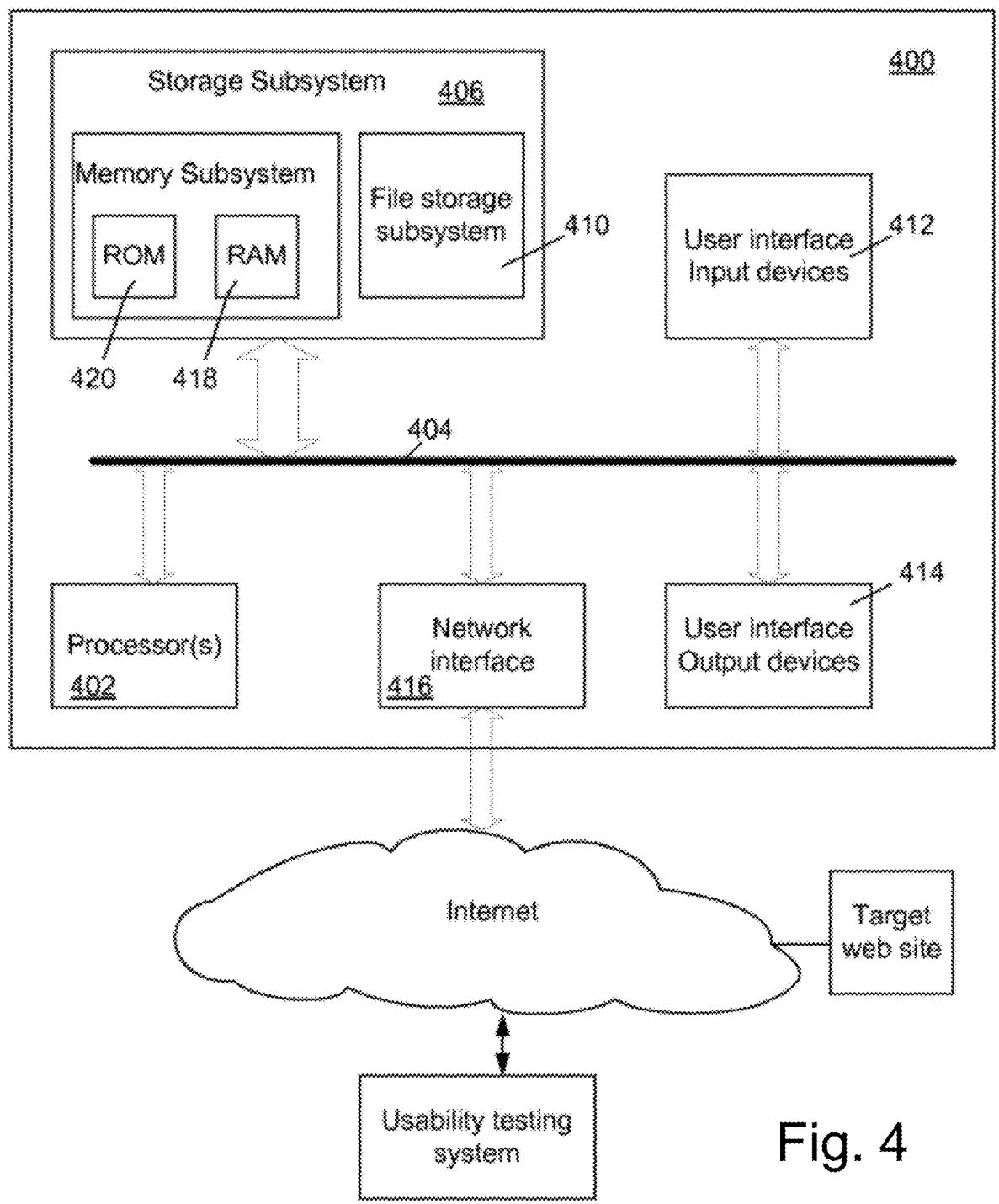
FIG. 4 is a simplified block diagram of a data processing unit configured to enable a participant to access a web site and track participant's interaction with the web site according to an embodiment of the present invention.

FIG. 4 illustrates an example of a suitable data processing unit 400 configured to connect to a target web site, display web pages, gather participant's responses related to the displayed web pages, interface with a usability testing system, and perform other tasks according to an embodiment of the present invention. System 400 is shown as including at least one processor 402, which communicates with a number of peripheral devices via a bus subsystem 404. These peripheral devices may include a storage subsystem 406, including, in part, a memory subsystem 408 and a file storage subsystem 410, user interface input devices 412, user interface output devices 414, and a network interface subsystem 416 that may include a wireless communication port. The input and output devices allow user interaction with data processing system 402. Bus system 404 may be any of a variety of bus architectures such as ISA bus, VESA bus, PCI bus and others. Bus subsystem 404 provides a mechanism for enabling the various components and subsystems of the processing device to communicate with each other. Although bus subsystem 404 is shown schematically as a single bus, alternative embodiments of the bus subsystem may utilize multiple busses.

User interface input devices 412 may include a keyboard, pointing devices such as a mouse, trackball, touchpad, or graphics tablet, a scanner, a barcode scanner, a touch screen incorporated into the display, audio input devices such as voice recognition systems, microphones, and other types of input devices. In general, use of the term input device is intended to include all possible types of devices and ways to input information to processing device. User interface output devices 414 may include a display subsystem, a printer, a fax machine, or non-visual displays such as audio output devices. The display subsystem may be a cathode ray tube (CRT), a flat-panel device such as a liquid crystal display (LCD), or a projection device. In general, use of the term output device is intended to include all possible types of devices and ways to output information from the processing device.

Storage subsystem 406 may be configured to store the basic programming and data constructs that provide the functionality in accordance with embodiments of the present invention. For example, according to one embodiment of the present invention, software modules implementing the functionality of the present invention may be stored in storage subsystem 406. These software modules may be executed by processor(s) 402. Such software modules can include codes configured to access a target web site, codes configured to modify a downloaded copy of the target web site by inserting a tracking code, codes configured to display a list of predefined tasks to a participant, codes configured to gather participant's responses, and codes configured to cause participant to participate in card sorting exercises. Storage subsystem 406 may also include codes configured to transmit participant's responses to a usability testing system.

Memory subsystem 408 may include a number of memories including a main random access memory (RAM) 418 for storage of instructions and data during program execution and a read only memory (ROM) 420 in which fixed instructions are stored. File storage subsystem 410 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Figure 5:
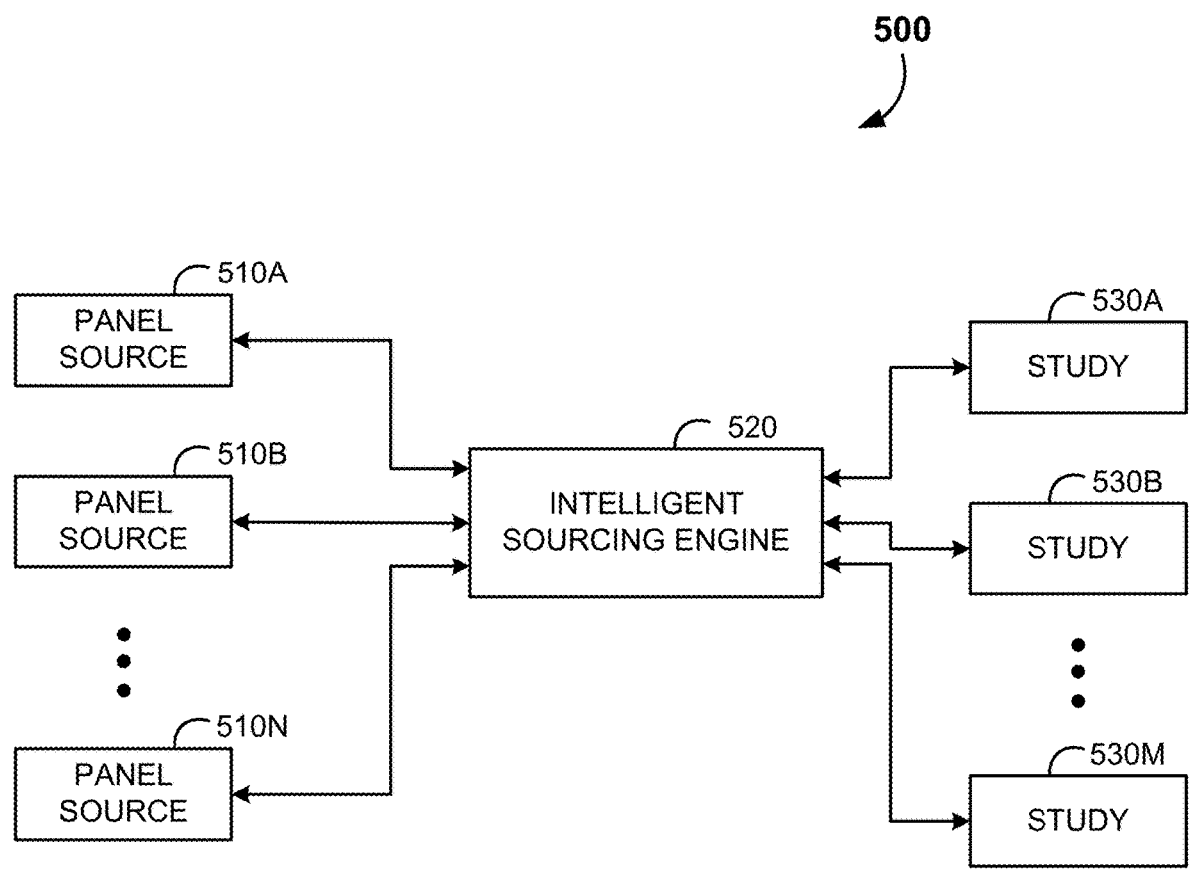
FIG. 5 is an example logical diagram of an intelligent sourcing engine architecture, in accordance with some embodiment.

Now that systems and methods of usability testing have been described at a high level, attention will be directed to the improved methods and systems employed for the sourcing of participants for these usability studies. As noted, the outcome of these studies is entirely dependent upon having suitable participants. The most advanced UX testing platform is worthless without sufficient numbers of qualified participants to engage in the testing. FIG. 5 addresses this need for sourcing qualified participants be presenting an example logical diagram of an intelligent sourcing engine architecture, shown generally at 500. Essentially this architecture includes a plurality of participant panel sources 510a-n, each interfacing with an intermediary intelligent sourcing engine 520. The intelligent sourcing engine 520 may include one or more servers operating at the same location as the aforementioned usability testing system 150. In some alternate embodiments, the intelligent sourcing engine 520 may operate as a standalone system.

The intelligent sourcing engine 520 may communicate with the panel sources 510a-n via the internet or other suitable information transfer network. The intelligent sourcing engine 520 likewise interfaces with a usability testing system 150 or with multiple independent UX experience systems, to receive studies 530a-m. Examples of study 530a-m requesters may include unified testing platforms such as UserZoom.

The studies 530a-m include information regarding the study scope, participant requirements, and in some embodiments the price the study is willing to expend upon the participants. Alternatively the study may be assigned a pricing tier, indicating the level of service contract the study originator has entered into with the usability testing platform.

The participant panel sources 510a-n likewise include information to the intelligent sourcing engine 520, such as total available participants on their platform, names or other identifiers for their participants, and collected known attributes for their participants. There are a few attributes that are almost universally collected by panel sources. These include participant gender and age, for example. However, other panel sources may collect additional panelist information beyond these most basic attributes. These other collected data points may include marital status, political affiliation, race, household income, interests, location, home ownership status, dietary restrictions/preferences, education levels, number of people in the household, and the like.

The intelligent sourcing engine 520 consumes the panelist information provided by the panel sources 510a-n and combines it with collected analytics for the potential participants. These potential participants are then initially filtered to exclude historically ineligible participants. The intelligent sourcing engine 520 then performs complex matching of the panel sources to the studies 530a-m based upon participant cost/price, quality, time to field/speed, and availability concerns. This matching step includes considerations for study requirements, be they targetable attributes (known to the system) or non-targetable attributes (attributes which must be estimated for in the participant population). The process by which this matching occurs shall be discussed significant detail further below.

Figure 6:
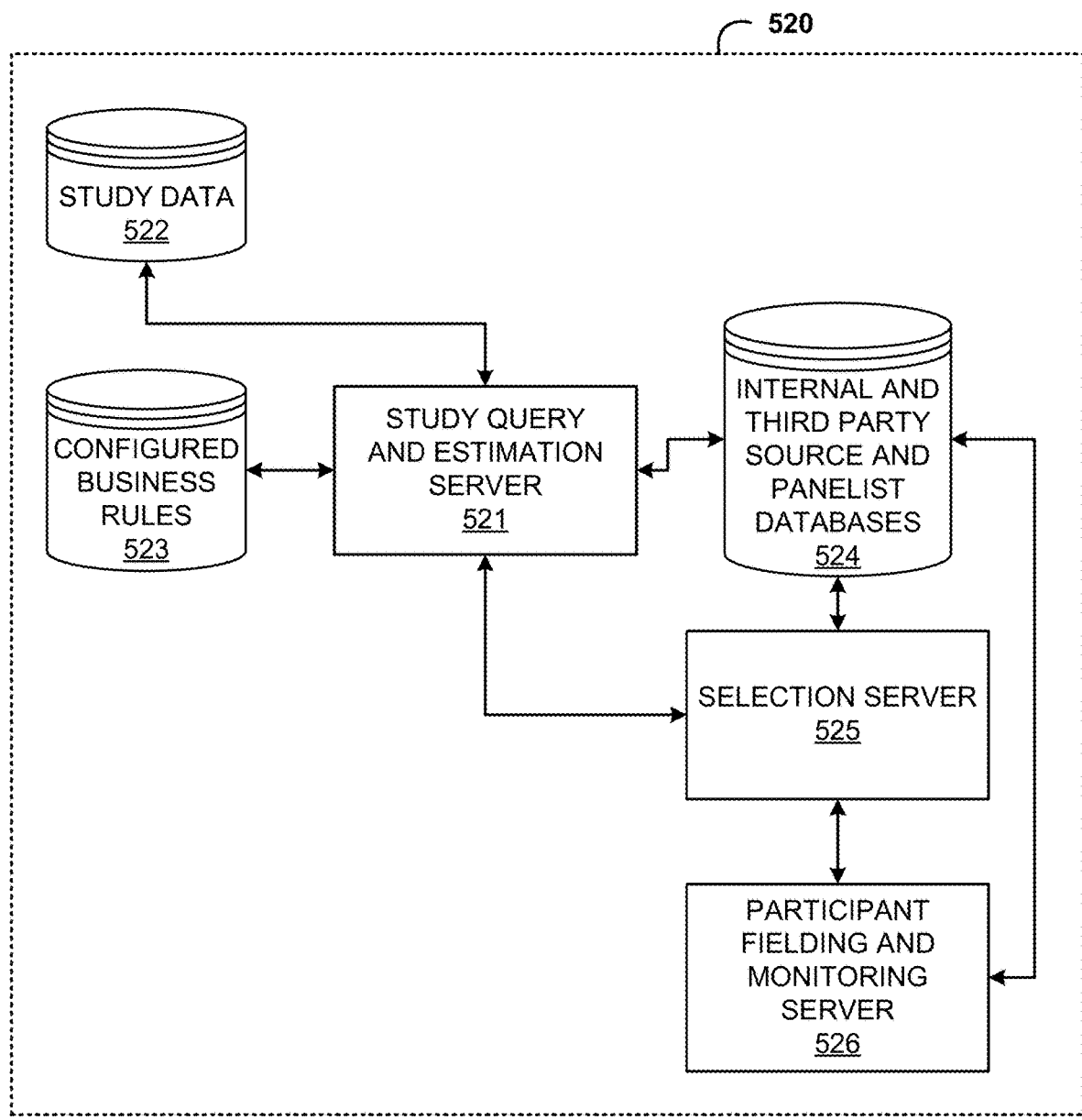
FIG. 6 is a logical diagram of the intelligent sourcing engine, in accordance with some embodiment.

Turning to FIG. 6, a logical diagram of the intelligent sourcing engine 520 is provided in greater detail. As noted before the studies 530a-m provide study requirements. These requirements, at a minimum, include the number of participants required, a timeframe they are needed, and some basic indication of the attributes required. For example, a study may require 100 participants who are female, ages 35-45, who purchase luxury brands for a study that needs to conclude in three weeks. These study parameters are stored in a study data repository 522.

Additionally, the intelligent sourcing engine 520 may include a repository of preconfigured business rules 523. These rules may be supplied directly from the study provider, or may be generated automatically based upon the contractual obligations existing between the study provider and the intelligent sourcing engine 520 entity. For example, one study provider may enter into a contract whereby they pay flat fee for unlimited studies to be designed under 100 concurrent participants with a guaranteed participant field time of less than 30 days. The system may extrapolate out the rules as being no more than 100 fielded participants at any time, minimum cost per participant, minimum quality threshold, and fill rate/speed of participant sourcing less than 30 days. The system will therefore source participants that are above the needed quality threshold at the lowest price possible to meet the 30 day commitment. If more than 100 participants are needed, to the degree allowed by the 30 day commitment, the system will throttle participant sourcing to maintain a level less than 100 participants fielded at any given time. If it is not possible to meet the 30 day requirements and the less than 100 participant cap, then the system will reject the most recent study, and suggest a contract upgrade to a larger participant number.

As can be seen, the preconfigured business rules 523 have a significant impact upon how the system sources the participants, speed or participant sourcing, and which criteria may exclude possible participant sub-populations. This rule data 523 along with the study data 522 defining the study parameters are supplied to a study query and estimation server 521. This server 521 uses the constraints to determine which populations of participants are likely available given the source and panelist database 524 information regarding the numbers and types of participants available. The initial raw data in the source and panelist database 524 is collected from the panel sources 510a-n. This includes the number and unique identifier information for their potential participants, and well as any collected attribute information for them. The system over time is capable of augmenting this dataset with recoded quality metrics for participants, the likelihood of them engaging with specific studies, discovered attributes, and imputed attributes. Discovered attributes include attributes for which the participant provides direct feedback regarding, whereas imputed attributes are predictions of attributed based upon correlation models. These correlation models may be rule driven, or may be generated using known machine learning techniques. An example of an imputed attribute such models may generate is that individuals who are known to have an income above $175,000 (known attribute) are likely to be consumers of luxury goods (imputed attribute).

In addition to determining the sample availability, the study query and estimation server 521 is likewise tasked with determining the pricing and estimated time in field. As noted before, sometimes these criteria are predetermined by a service level contract. In such flat-fee structures the system defaults to the lowest price possible to deliver the other required criteria. However, when one or more of these criteria are not dictated by the business rules, the study query and estimation server 521 can generate the expected cost and or speed of the participant sourcing based upon the known source data. In situations where the sourcing engine does not have access to suitable panel sources on hand, the system may auto-connect specialized sourcing panel vendors (for example a country specific sourcing vendor).

In some situations the study query and estimation server 521 will determine that a study, as proposed, is not feasible commercially. In such situations the study query and estimation server 521 may flag the study request with an error and propose alternate study requirements. For example, the cost, speed, quality and number/availability of individuals is interrelated. For a given quality threshold, the speed, cost and number can be modeled as a topographical surface chart. If a study client wants to increase the speed of participant sourcing, either the number needs to reduce, cost increase, or some combination of the two. Very fast and large study groups will be very expensive to field.

Figure 16:
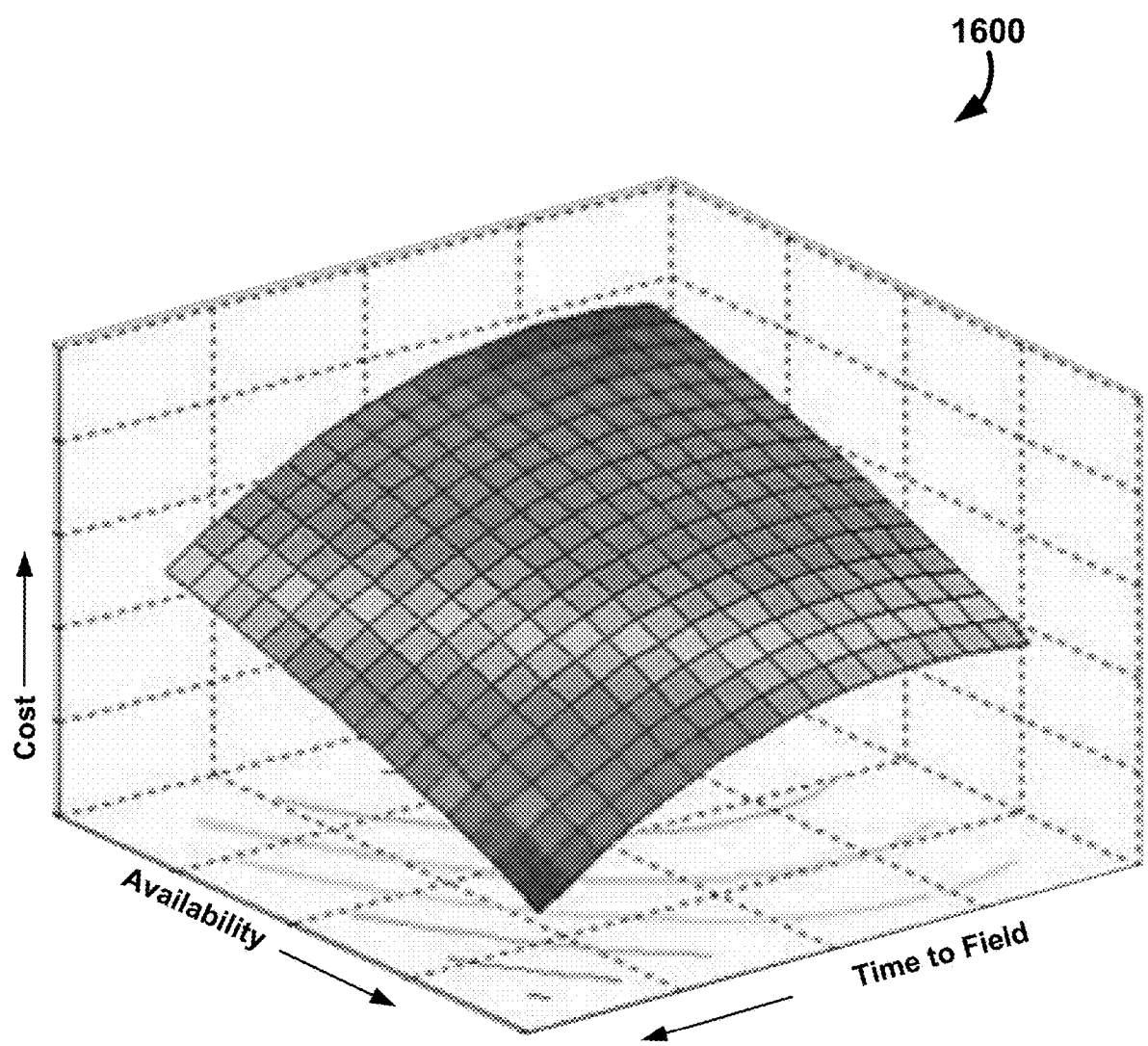
FIG. 16 is an example illustration of a surface chart illustrating relationships between participant numbers, time to field and cost, in accordance with some embodiment.

An example of such a surface graph is provided at 1600 of FIG. 16. This graph is intended to be illustrative and is not limiting to any particular embodiment. Note that faster speed with more available participants can be achieved, but at a higher cost. Conversely, lowering either the numbers required or the speed in which the participants are secured reduces the cost. The exact curvature of the surface is dependent upon the quality of participants desired, and the attributes needed in the participant group. Thus, for most studies, a unique curve is calculated based upon the known and imputed attributes of the participants in the panel sources 510*a-n* as compared against the requirements of the study 530*a*. For example, a study needing participants with a high school level education or more has far more available participants than a study who requires the participants to be computer programmers with ten years work experience in the field.

As noted, for some study criteria, it may simply be impossible (commercially or physically) to meet the required participant sourcing. In the case of a physical impossibility, the system will respond with a simple error and request for the criteria to be adjusted. Going back to the above example, if a study author wants to survey 10,000 participants with the afore mentioned computer programming experience, in two weeks, it is likely not physically possible to source that study, regardless of the price the study author is willing to pay. In the case of a commercial impossibility, the system will still throw an error, but will also propose an adjustment that enables the study to move forward. For example, assume the study author wants 100 computer programmers to engage in a two week study, but is on a basic flat-fee service contract. To fulfill the participant request, the query and estimation server 521 determines the cost of such a study is well outside of a threshold cost assumed for this basic service contract. The study author may then be proposed to either extend the study length by three additional weeks, or to upgrade their service contract to a premium level (thereby allowing for higher priced participants to be sourced).

Returning to FIG. 6, after the availability, price and time in field are all determined (or estimated) the selection server 525 performs the task of procuring the participants from the panel sources 510*a-n*. The selection server 525 utilizes information secured directly from the panel sources, as well as discovered and imputed data regarding the participants, which are all stored in the source and panelist database 524.

Figure 7:
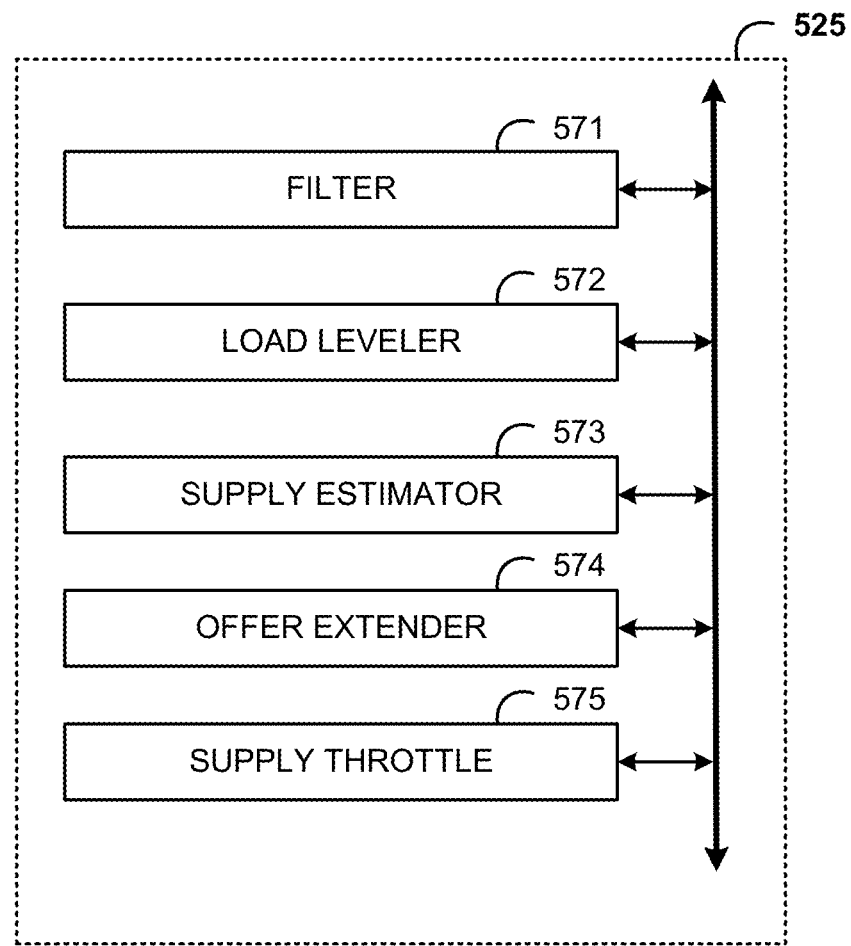
FIG. 7 is a logical diagram of the selection server, in accordance with some embodiment.

FIG. 7 provides a more detailed view of the components of the selection server 525. The selection server includes a filter 571 which initially removes participants from the pools that are known to not meet basic quality standards, fraudulent participants, and duplicate records. Fraudulent participants may be identified by their past performance. For example the speed taken by the participant and/or answer patterns may be used to identify participants who are not engaged, and are merely filling out studies for the reward. Generally these participants answer questions too quickly to be actually reading them (a time threshold based indicator of fraudulent participation), or the answers occur on a regular pattern (repeat pattern or continual selection of the first answer, for example). Another method of fraud detection may rely upon facial recognition to screen out duplicate participants, and to validate sociodemographic data supplied by the participants, such as gender, ethnicity, age, etc. In addition to being useful for fraud detection, facial recognition with known sentiment analysis (in addition to sentiment analysis of audio or text inputs) may be leveraged to collect non-biased feedback when using a product or engaging in the study. This feedback may be deemed a higher quality than participant supplied answers. Other possible pre-study participant monitoring for fraud detection may include checking the device for duplicates (utilizing MAC address for example), detection of bots by response speed or by challenge-response style questions, IP addresses from unsupported countries or the usage of illicit tools on the device.

Figure 8:
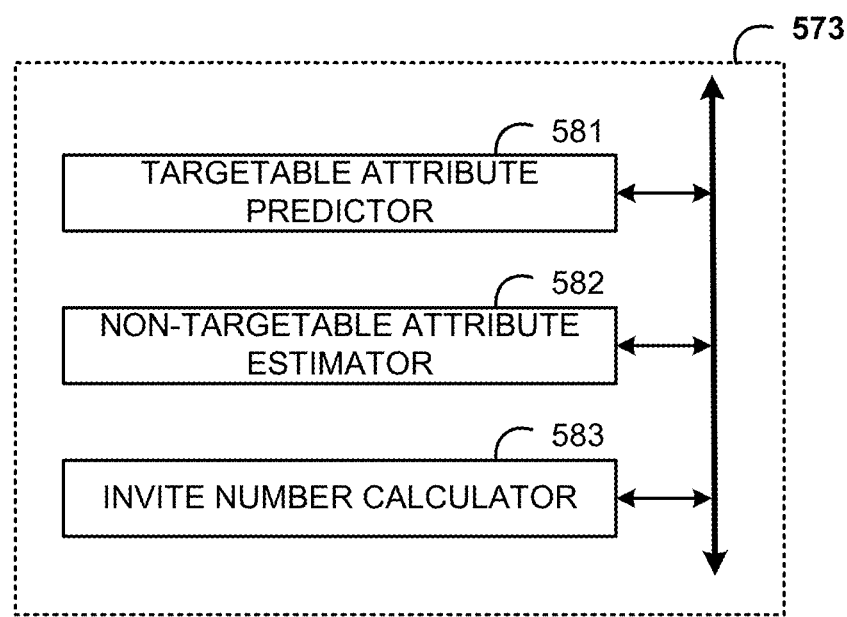
FIG. 8 is a logical diagram of the supply estimator, in accordance with some embodiment.

After filtering, a supply estimator 573 uses the study criteria to determine the likelihood of any one supplier to provide the needed number of participants. FIG. 8 provides greater detail of this supply estimator 573. A targetable attribute predictor 581 looks at study attributes which are targetable, and predicts the number of participants in the supplier pool that are likely to have these attributes. Targetable attributes include attributes for which the result is known or knowable. Age, gender, geography, national origin, county, household income, etc. are all considered targetable attributes. Some targetable attributes for the supplier's participants are known. As mentioned, for example, age and gender are generally known values across all panel suppliers 510*a-n*. Other targetable attributes are discovered through survey questions over time and are stored in the source and panelist database 524. For example, if a participant engages with a prior study in which their marital status is asked, this data may be stored in relation to the participant. Over time, the targetable attributes for a given participant may be expanded using patter recognition machine learning. For example, attributes like the participants preferred participation hours, prior screener responses, browsing and click patterns, etc., may all be collected and leveraged for targeting a particular participant for later studies.

For unknown targetable attributes, the targetable attribute predictor 581 may use statistical techniques to determine the number of participants in the supply, to a certain confidence level, have the attribute. The targetable attribute predictor 581 will map the supply population to the most granular population for which data is available, and extrapolate the attribute prevalence within the supply population. Outside sources, repositories and indicators may also be leveraged to collect information on targetable attributes for participants which are not know internally to the system.

For example, assume the targetable attribute in interest is for participants who are parents. Demographic information about birthrates and family status by age are known for state level geographic areas. A panel supply 510 based in the western United States consisting of participants predominantly between 20-30 years old, can have the prevalence for being a parent estimated by using this state and age demographic data. In this example, parental rates for this age bracket are below the general population level. Furthermore, for the states at issue, the trends are even lower. This mapping of the supply population to the most granular populations for which the attribute is known allows the targetable attribute predictor 581 to more accurately determine the number of individuals in the supply populations that meet the targetable criteria.

In a similar vein, the non-targetable attribute estimator 582 generates estimates for non-targetable attributes that are desired for the study in the supply populations. Non-targetable attributes are more ephemeral than targetable attributes. These are attributes that change (such as the participant having an ailment like the flu) or are attribute that are obscure and would not be commonly collected (such as how many 18$^{th}$ century French novels the individual owns, for example). Non-targetable attributes must be entirely estimated based upon incidents of the attribute in a given population (in much the same manner as targetable attribute estimations), but this is often not possible as even in the aggregate there is little information available regarding prevalence of these attributes. As such, the system generally begins a small scale sampling of the various populations, and subjecting these sampled individuals to questions to determine the frequency of the non-targetable attribute. Once statistically sufficient (e.g., seventy-fifth, eighty-fifth, ninetieth or ninety-fifth percentile confidence) data has been collected, then the estimate for the prevalence of the non-targetable attribute may be determined for the given supply. The statistical methodologies for sampling, and determining frequency within a larger population to a given confidence level are known in the field of statistical analysis, and as such will not be discussed in any exhaustive detail for the sake of brevity.

After the supply populations have thus been winnowed down to the total numbers of participants that likely exist that meet the study criteria, an invite number calculator 583 is capable of determining how many individuals from each panel supplier 510*a*-*n* could conceivably be extended an invitation to join the study. This determination is based upon past sign-up frequency for the given panel supplier, compared against time in filed/speed requirements, and adjusted for macro-factors that may impact study participation. Invitations may be active (e.g., a push notification or email) or passive (e.g., call to action in a study listing dashboard).

For example, assume it is found that supplier A is determined to have 250 members that meet the study criteria, and supplier B has 150 members that are expected to meet the criteria. In the past, of the eligible individuals in supplier A, generally 30% join an offered study after a two week period. For supplier B, it is found that 50% of the members join after two weeks. Thus, if a study wanted to be completed within that two week period, both supplier A and supplier B could be extended 75 invitations. However, assume that this study is occurring over the Christmas and New Year holidays. Historically, participation rates drop dramatically during this time period, for the sake of this example by two thirds. Thus, for the given study, it is likely that both these suppliers are only able to provide 25 participants.

In the above manner the invite number calculator 583 determines the capacities the panel sources 510*a*-*n* are realistically able to provide a given study. This process has been simplified as additional metrics, such as numbers of participants involved in alternate studies, closeness of attributes between these concurrent studies, and participant fatigue factors may likewise be included in the supply estimations. In particular, multiple overlapping studies may drain the availability of participants. This is especially true for studies for which the participant attributes overlap. Clustering algorithms, or least means squares functions may be utilized to define the degree of attribute overlap. This value can be used to weight (via a multiplication function) against study size to determine a factor of interference. This factor may be scaled based upon prior experience of the reduction in participant rates when multiple overlapping studies occur, and is used to reduce the estimates participant number (either by subtracting an absolute number of "tied up" participants, or via a weighing/multiplication of the estimated participant numbers by the scaled factor). Likewise, raw number of participants (or numbers modified by closeness of attributes as previously discussed) that occurred in the two, for or six weeks prior to the present study may be used to determine a "fatigue" reduction in participants. A few individuals will enjoy and endeavor to engage in one study after another. However, many individuals tire of responding to studies, and will throttle engagement in a cyclical manner. This fatigue factor may likewise be used to adjust the expected number of participants available, in some select embodiments.

It should be noted that the discussions herein have been centered on sourcing a particular set of individuals for a study as a single cohort. This is not generally advantageous if the study itself desires different population segments. For example, if a given study wants 20 men working in a company with greater than 500 employees, and 30 women in working in finance it may be advantageous to source these population segments differently. For example, source A may have more potential participants that work in larger businesses, and thus may be utilized to source the male participants, whereas a second source B may be known to have more women working in finance as possible participants.

Returning to FIG. 7, an offer extended 574 may utilize the estimated capacities of the various suppliers to actually extend invitations to join the given study. This offer extension is always subject to the constraints and business rules discussed previously. For example, and panel supplier 510*a*-*n* that falls below a quality threshold may be excluded entirely from participating. In some embodiments, this quality cutoff threshold is determined by the same metrics discussed previously: too many of their participants answering earlier questions too quickly (or too slowly) and repeated answer patterns. Additional quality metrics may be compiled by manual audit of the participant's previous answers, or through the inclusion of normalization questions/red herring questions, or when a participant provides too few 'clicks' on a clicktest task. Generally fewer than five selections on a clicktest indicates a low quality participant. Normalization questions are questions asked repeatedly in the same way, or in different ways looking for consistency in answers. Likewise, red herring questions are simple questions that if not answered correctly indicates the participant is not actively engaged. Furthermore, a study author may rate the participant for quality as well. In some cases, the study author/client may determine that a participant is not suitable and may exclude the participant from engaging in any more of their studies.

Regardless of the metrics relied upon to collect quality measures, even when insufficient data is collected for any one participant, when the supplier as a whole is shown to have a quality issue not meeting the quality cutoff threshold, this supplier may be entirely discounted from the offer extension process.

Generally, after the threshold quality issue is determined, the offer extended 574 ranks the suppliers by price, and allocates the participant invitations to the suppliers in ascending order of their respective price/cost. For example, suppose Supplier A in our earlier example has 25 available participants, as was determined, each costing $5 to engage. Supplier B also was determined to have 25 available participants, however supplier B costs $7 per test participant. For a study requiring 40 participants, supplier A would be extended 25 invitations, and supplier B only 15 invitations.

However, when two suppliers are substantially similar in cost, then the system may alternatively determine the invite allocation by looking at the relative capacity of the various sources, and leveling the load imposed upon any given supplier. The load leveler 572 performs this tracking of participant demands being placed on any given panel supplier 510*a-n* and makes load leveling determinations by comparing these demands against total participants available in each supplier. For the purposes of this activity, "substantially similar in cost" may mean less than either five, ten, or fifteen percent deviation in cost, based upon embodiment.

After invitations to join the study are sent to one or more of the panel suppliers 510*a-n*, the rate of acceptance can be monitored, and the number of invitations sent modified by a supply throttle 575. For example, if a lower cost supplier ends up filling participants much faster than anticipated, then it is likely the estimates for the available participants was incorrect, and the total number of invitations to this supplier can be increased while the number for a higher cost supplier is ratcheted back. Additionally, it may be beneficial to batch release invitations to the suppliers in order to spread out study engagement. This allows the study systems to reduce spikes in computational demand, and further by extending study time to the limits of the service agreement with a client, the costs to the study provider can be more readily managed. Further, initial study results often times lead to changes in the study questions or objectives in order to explore specific insights more fully. By extending study invitation release, the throttle 575 allows time for such study updates to occur.

In addition to sending out invitations and collecting acceptances, the system may be configured to collect legal consent for the collection of personally identifiable information from the participants to satisfy various privacy laws (e.g., GDPR). This legal consent may be tailored for the particular study, for the specific study author/client more broadly, or for any future studies the participant chooses to engage in.

Returning to FIG. 6, after the selection server 525 sends out the initial invitations to the study the participant fielding and monitoring server 526 monitors the acceptance rates of the participants, as well as any data that is collected from screening questions regarding the participants. This data is stored in the source and panelist database 524, and the rates of invitation acceptance is particularly utilized by the supply throttle 575 as indicated previously. One additional feature of the participant fielding and monitoring server 526 is its ability to utilize known information about participants to port the participant data into the study administration system as a file, which allows the combining of source data with collected data. Thus, when different participant sources are utilized, where some information is known for some participants and not others, the file enables mapping of the known data to questions in the study. Thus, for example, participants whose household income is already known will not be presented with a study question relating to their income levels; only participants where this data is unknown will be required to answer such questions.

In addition to merely monitoring participants, before study start, and in order to improve participation quality, the system may implement an automatic training system for panelists to improve their skills to 'think-out-loud', how to provide feedback, what type of feedback is relevant for the client, etc. In general, people do not know how to talk out loud, naturally, while they interact with a digital interface. The training system makes them go through an automatic/self-serve learning flow and certifications.

Figure 9:
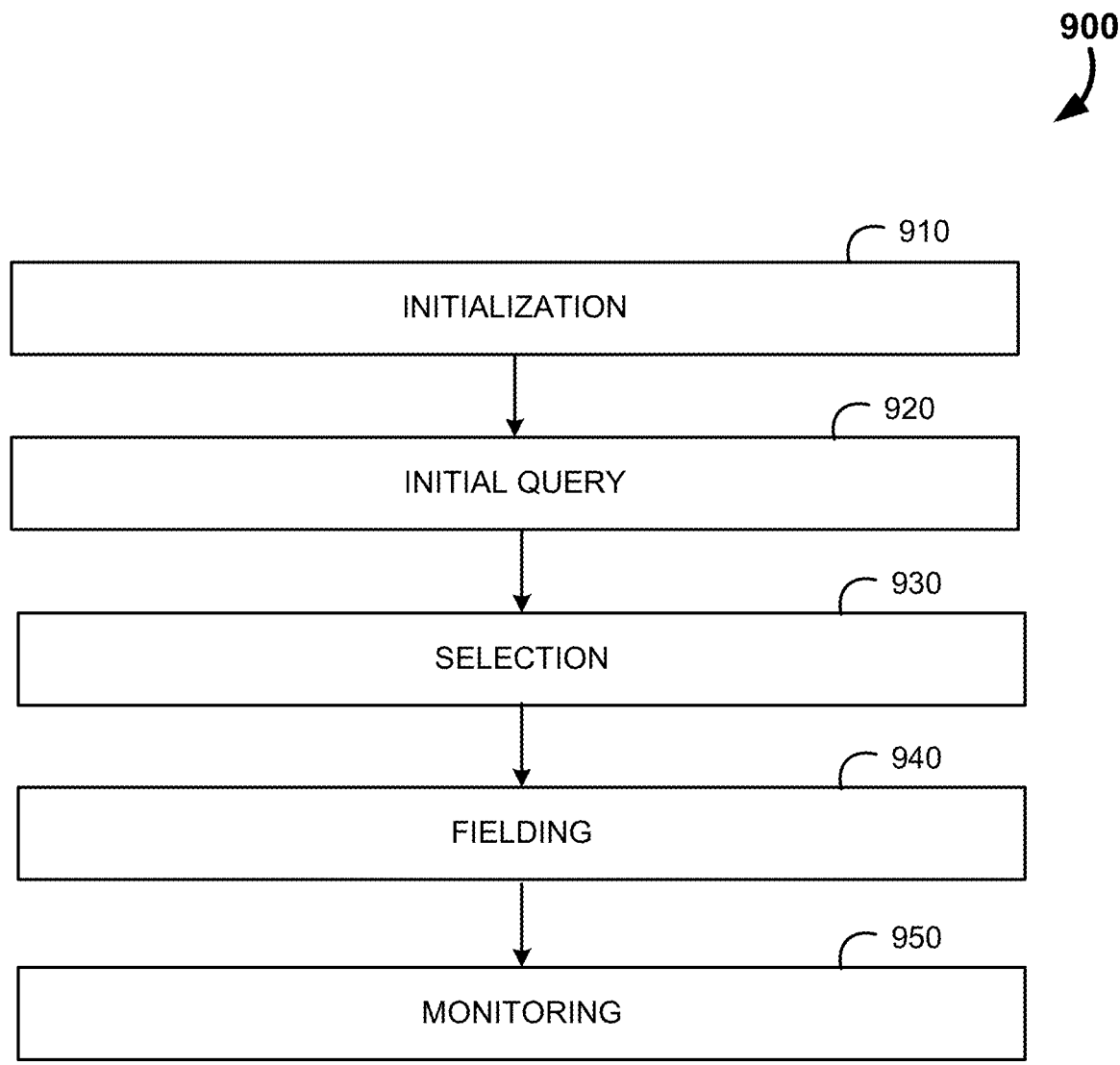
FIG. 9 is a flow diagram for an example process of participant sourcing, in accordance with some embodiment.
Figure 10:
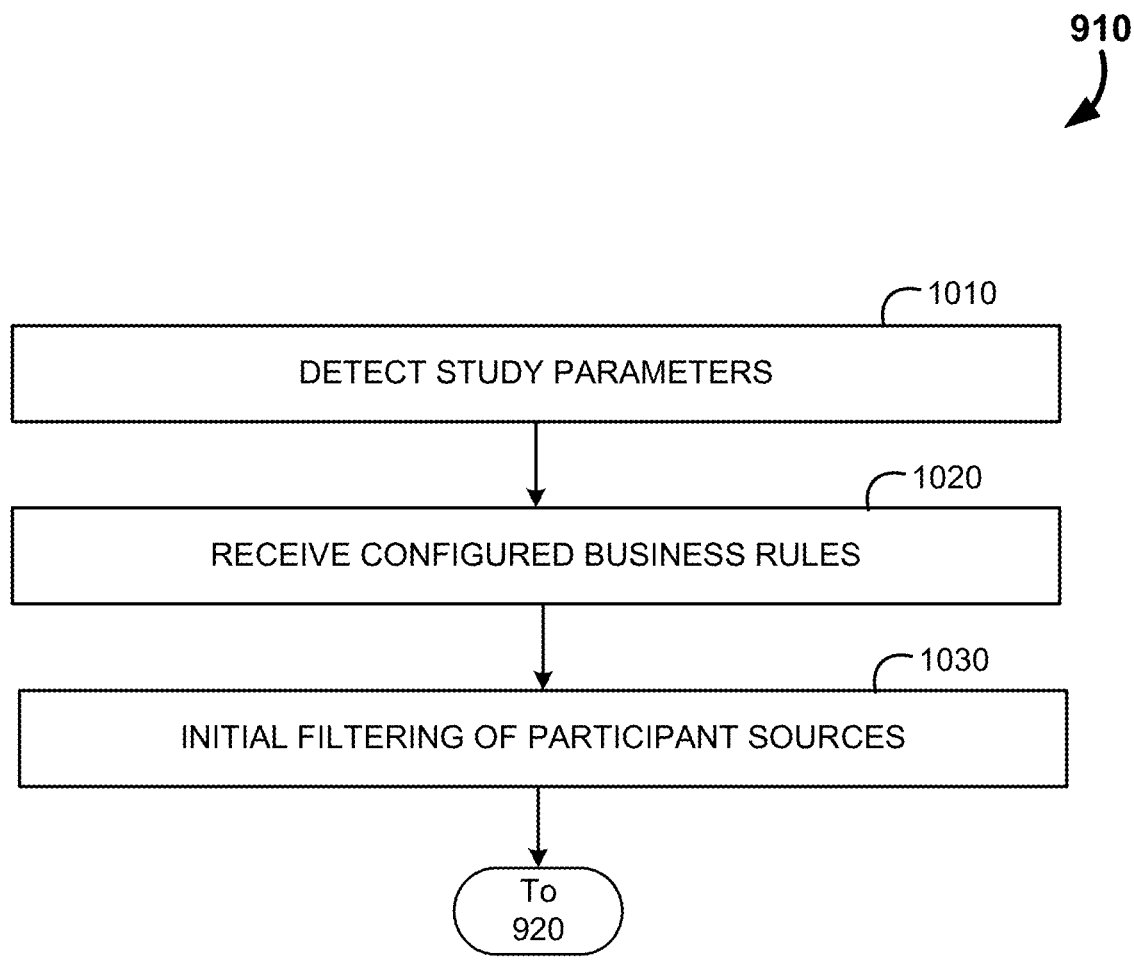
FIG. 10 is a flow diagram for the example process of participant sourcing initialization, in accordance with some embodiment.

Now that the systems for intelligent participant sourcing have been described in detail, attention will be turned to example processes and methods executed by these systems. For example, FIG. 9 is a flow diagram for an example process 900 of participant sourcing, in accordance with some embodiment. This example process begins with an initialization of the participant sourcing (at 910). This initialization is shown in greater detail in relation to FIG. 10, where the study parameters are first detected (at 1010). These parameters include the length of the study estimations, demographic criteria/participant requirements, and study type. The business rules are likewise received (at 1020). These rules may have a default set of configurations, may be configured by the client directly, may be automatically generated leveraging machine learning, or in some embodiments, may be extrapolated from a service level agreement between the client and the participant sourcing entity. The participant sources are then filtered (at 1030) to remove duplicate participant records, and to remove participants that have been found by the system to be fraudulent and/or below a basic quality threshold. Again, quality and fraudulency metrics for a participant may be gained through temporal tracking of prior participant activity, unusual answer patterns by the participant, or by specifically 'testing' the participants by red-herring style questions or questions that look for consistency in the participants answers. In addition to filtering out fraudulent participants when generating the panel, there may further be a fraud check when the participants sourced enter the study. These fraudulent individuals are generally "quarantined" to ensure they are removed from the dataset of eligible participants for all future studies. It is also possible to quarantine (permanent or temporarily) participants that have already participated in a study for a particular client from ever engaging in another study for that particular client.

After initialization in this manner, returning to FIG. 9, an initial query is made (at 920). The initial query is when the intelligent sourcing engine 520 initially connects with the panel sources 510*a-n* to determine sample availability, pricing and estimated time in the field from the sources. While the intelligent sourcing engine 520 communicates regularly with the panel sources 510*a-n*, and thus has an indication of the participants available at each source, due to other commitments, membership changes, or contractual restrictions, the available number of participants, and pricing may vary from one study to the next. As such prior to any panel selection activity, these items are ideally confirmed via the initial query with the various suppliers.

Figure 11:
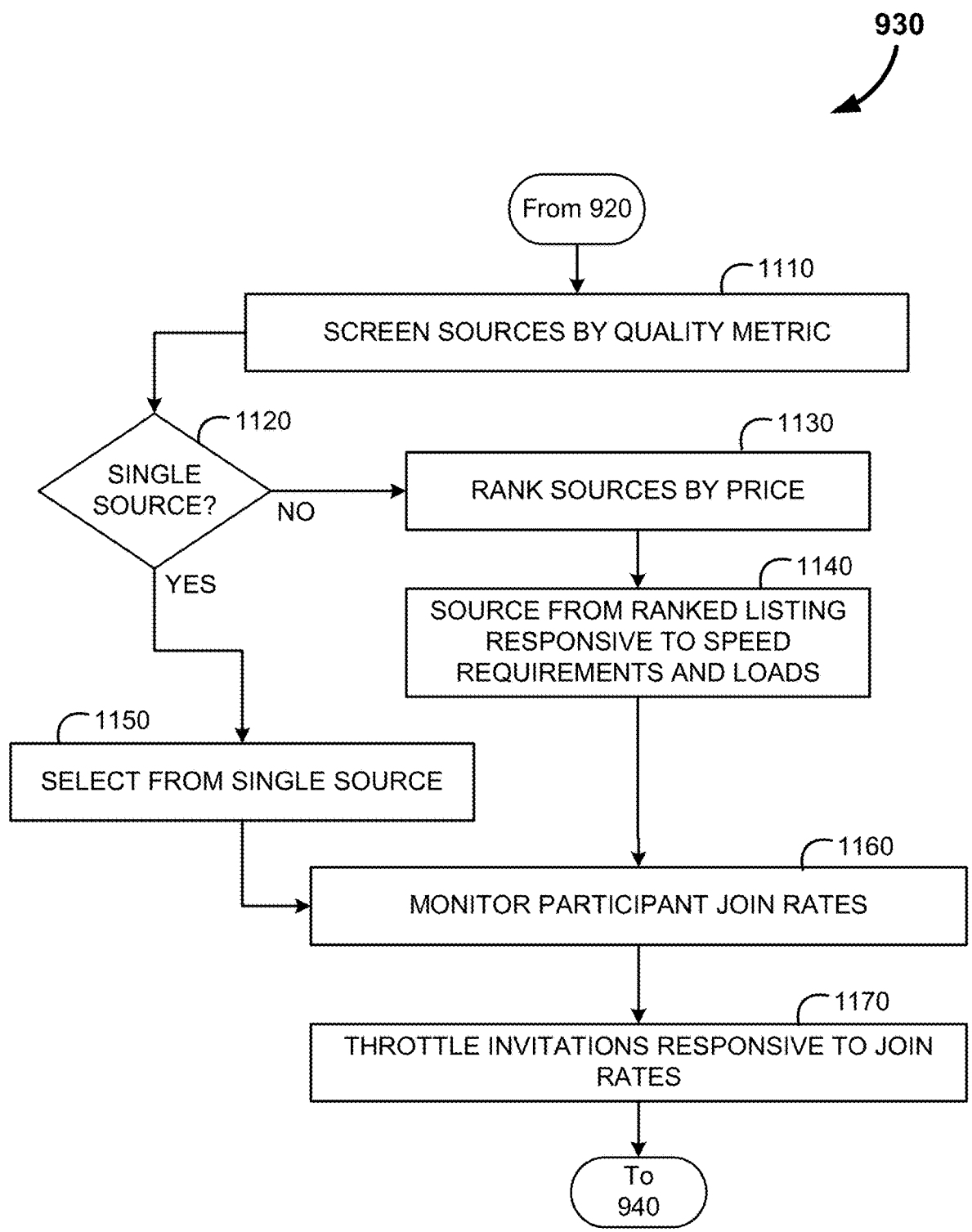
FIG. 11 is a flow diagram for the example process of participant selection, in accordance with some embodiment.

Subsequently, the selection of the participants is performed (at 930). FIG. 11 provides a more detailed flow diagram of this selection process. An initial requirement for any supplier is that their quality meets or exceeds a threshold set by the intelligent sourcing engine 520. Any sources that do not meet this threshold are screed from consideration (at 1110). Next a determination is made if a single source is able to supply all the needed participants for the given study (at 1120). As discussed in depth previously, this determination is made by comparing the expected capacity of the sources against study requirements. This capacity is calculated by the total number of participants available, the targetable attributes either known or predicted, the non-targetable attributes that are estimated for, and any external factors and error adjustments.

If a single source has the capacity to meet a study's demands, and the source is substantially the lowest price provider, then all participants can be invited from that single source (at 1150). Often however, no single source can meet the participant demands, or the sources that can are more expensive than other available sources. In this case, the sources are ranked by price (at 1130). The participants are then sourced from this price ranked listing of suppliers responsive to the speed requirements, and where the pricing and speed are substantially comparable, based upon load leveling between suppliers (at 1140) as previously discussed.

Regardless of whether the participants are sourced from a single provider, or multiple providers, the system subsequently monitors the participant join rates (at 1160), as well as collected information regarding the participants. This collected information may be leveraged to update the participant and source database, and the join rates are utilized to throttle or speed up invitation rates if they differ from expected participant join rates (at 1170).

Figure 12:
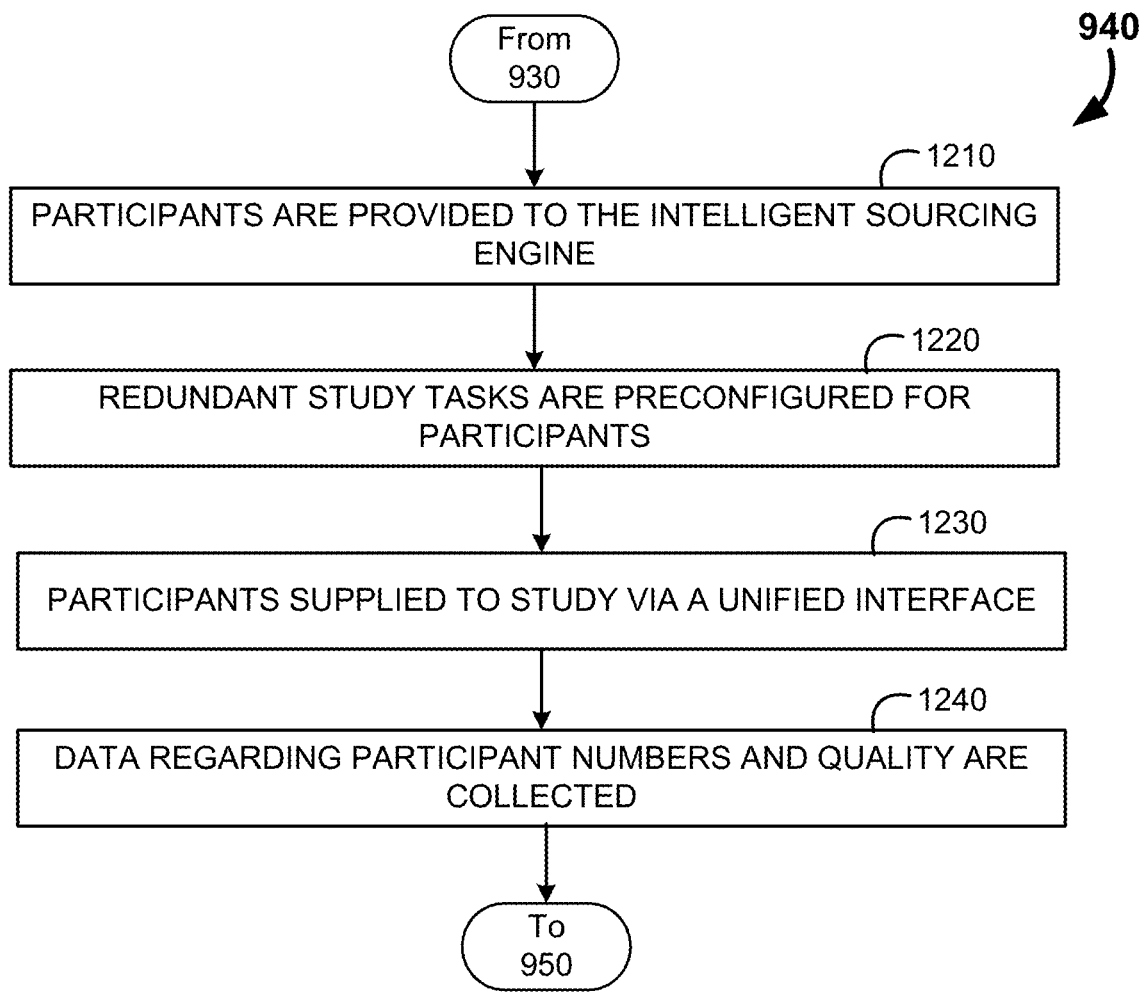
FIG. 12 is a flow diagram for the example process of participant fielding, in accordance with some embodiment.

Returning to FIG. 9, after participant selection is thus completed (or on an ongoing basis as participants are joining), the participants are fielded (at 940). FIG. 12 provides greater detail of this participant fielding process. Initially the participants are provided to the intelligent sourcing engine from the various panel sources (at 1210). A file is generated for each participant based upon data known by the panel source that is supplied, as well as data for the participant that has been previously discovered from an earlier study that the intelligent sourcing engine has stored. It is possible, based upon sources of the participants, and prior tasks by the participants, that each participant file may include differing degrees of information. This file is provided to the study administration server (usability testing system), enabling questions and or tasks that are redundant (answers are already known for) to be preconfigured for the given participant (at 1220). This increases efficiencies for the study author, as well as reducing testing time for participants (reduced participant fatigue). Subsequently the participants are supplied to the study by the unified interface hosted by the usability testing system (at 1230). As the participant engages in the study, data regarding participant targetable attributes, quality, and numbers involved in the study are reported back to the intelligent sourcing engine (at 1240). This information is used to enrich the dataset regarding the participants for future studies, as well as assisting with participant sourcing throttling (as previously discussed).

Figure 13:
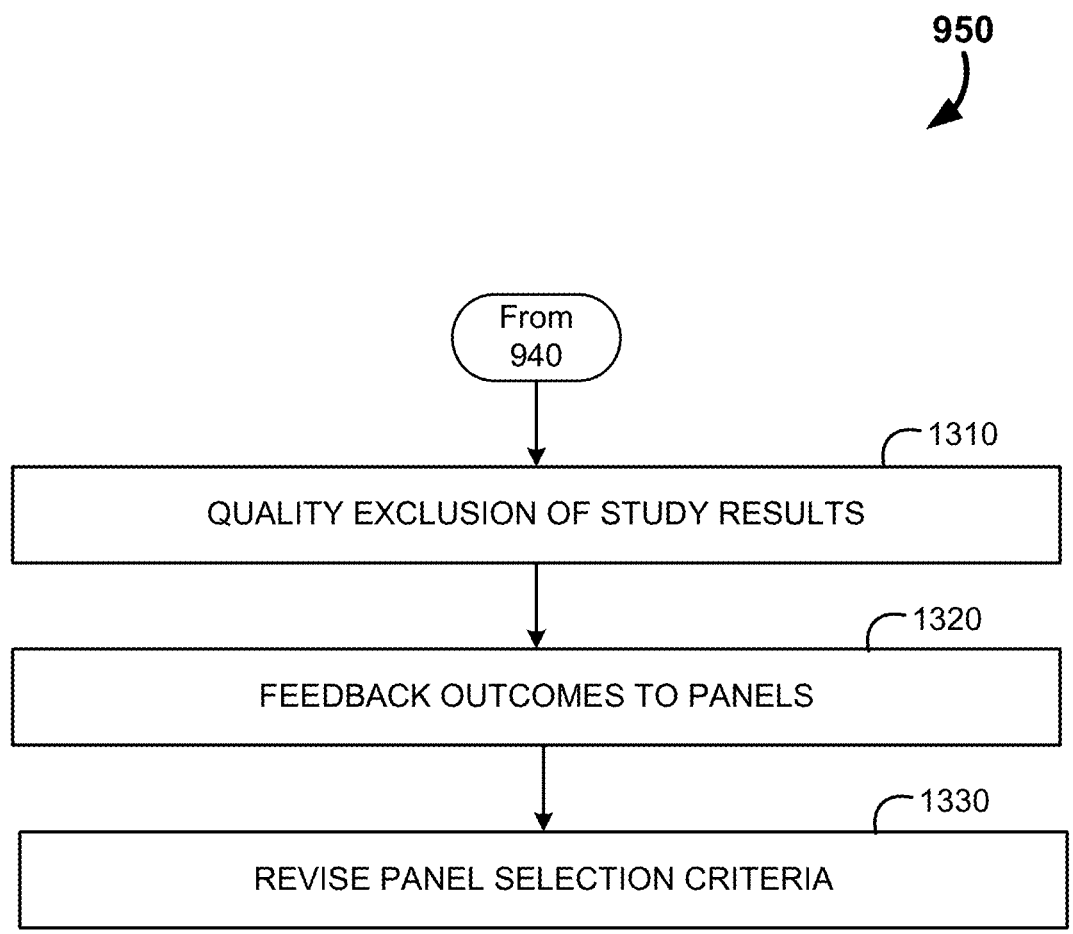
FIG. 13 is a flow diagram for the example process of participant monitoring, in accordance with some embodiment.

Returning to FIG. 9, the last step in the participant sourcing process is the monitoring of the resulting outcomes (at 950). FIG. 13 provides greater detail into this monitoring process, whereby study results are filtered based upon quality exclusions (at 1310). Both the raw study outcome information, and those that have been filtered for quality, are feed back to the panel sources (at 1320). This feedback allows the separately operated panel sources to improve their own internal processes. In conjunction, the panel selection criteria can be revised (at 1330). For example, assume that source panel A determines that the qualification rate of participants is below the estimated level, and in order to entice more participants requires the price to be raised. This results in the price of panel source A to be greater than that of panel source B. The intelligent sourcing engine would be able to dynamically react to these changing conditions by discontinuing sourcing of participants from panel A and instead switch to the lower cost panel B. Once the participant quote is reached, the panel sources are signaled to stop sending participants to the intelligent sourcing engine. In addition to revising panel selection, the system may increase or reduce the panelist costs/payments based upon rate of participant acceptance of invitations versus the expected rates of acceptance.

In addition, revising panel selection may select, store and exploit historically monitored data to automatically generate or modify business rules to improve the study performance, optimize costs, and therefore improve the previous steps of this example process via cumulative feedback improvements. The historically monitored data may include, for example, response time, quality of results, invitations sent versus actual participation rates, desired completions of the study, and the like. The business rules that are generated or modified may include the frequency of invitation launches, quantity of the invitation launch, panel provider ranking, and the like.

In some embodiments, a score may further be generated based upon historical data for a panelist. This panelist score may utilize parameters such as participation frequency, inactivity time, qualifications obtained by the panelist, client reviews, and the like. This panelist score may be leveraged when recruiting participants for a study, again feeding back to improve cost and quality of participant sourcing. For example, the average panelist scores for a particular source may be known, and a particular average panelist score for the study be configured as a target. The panels sourced from may be modified to ensure the target average panelist score for the study is met.

Lastly, usage is recorded for the purposes of billing customer and paying participant suppliers. This concludes this example process of sourcing participants for usability studies.

Figure 14:
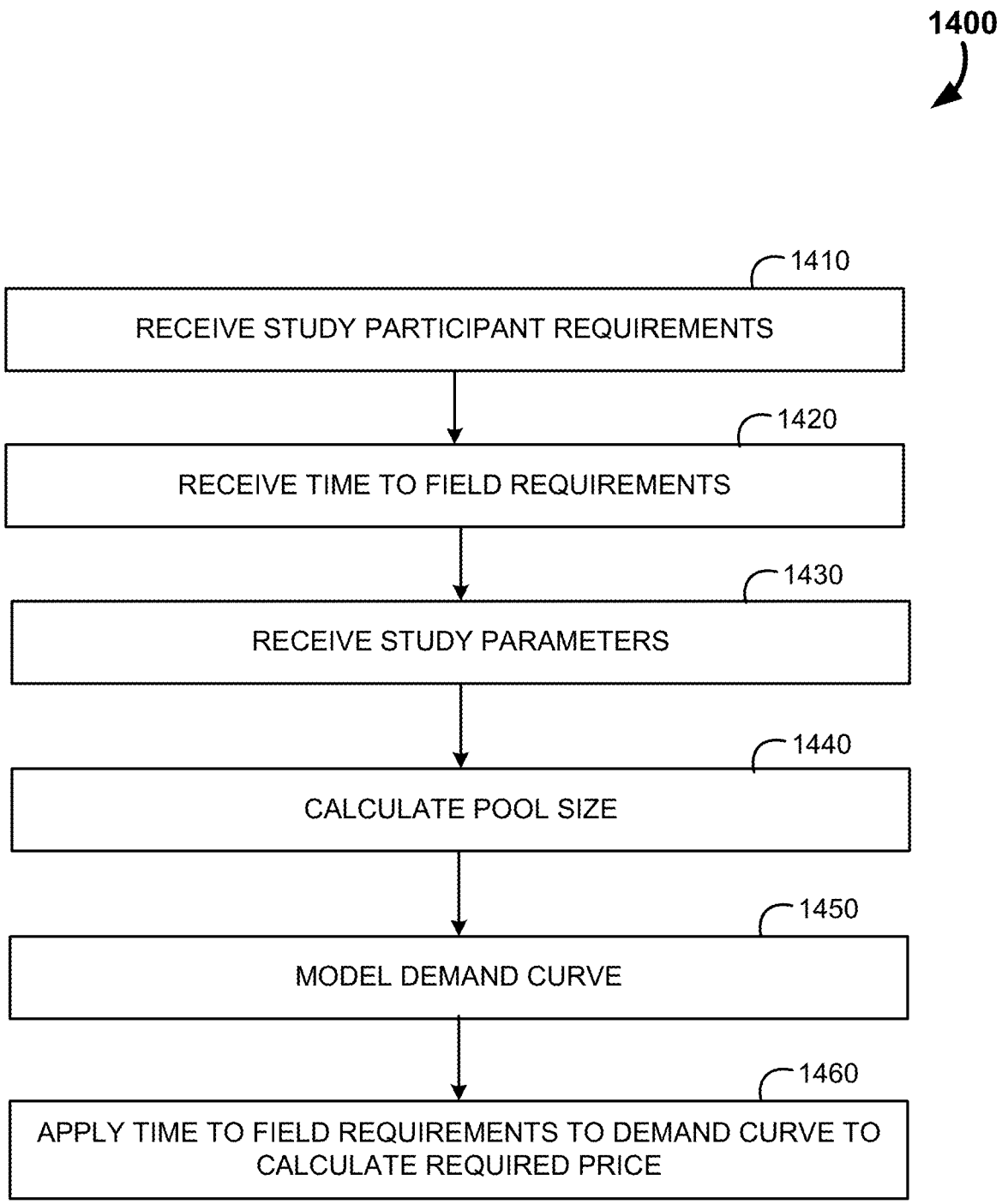
FIG. 14 is a flow diagram for the example process of dynamic participant sourcing pricing, in accordance with some embodiment.

Next attention will be directed to an example process for participant sourcing pricing determination. This pricing determination may operate in parallel with the above described participant sourcing. As noted before, in some cases the study authors have entered into a service agreement whereby a subscription style fee is charged to the client by the intelligent sourcing engine entity for a particular level of service. Having more participants, higher quality participants, or faster in-the-field time may require the client to upgrade to higher tier service agreements, as has been already discussed in some detail. However, in alternate embodiments, it may be desirable to have a "pay as you go" style participant sourcing. In such situations the client/study author provides desired quality, speed, and participant numbers desired, and the system performs a pricing calculation for delivering the required participant pool. FIG. 14 provides an example flow diagram of such a pricing process, shown generally at 1400. As noted, the initial step in this pricing determination is the setting of the participant requirements (at 1410). This includes attributes required for the participants, and quality of the participants (optional in some embodiments). When quality is not a necessary criteria to be provided the system defaults a basic quality level. The study author likewise needs to define the time-to-field requirements (at 1420). Lastly, the study parameters are defined in the system (at 1430). Study parameters typically include the number of participants desired for the study, type of study engaged in, and expected length of the study. Obviously longer studies require more incentive to the participants to complete. However, in a similar vein, study complexity, and degree of effort likewise impact pricing. For example a survey lasting fifteen minutes will require a lower price than a click through task where mouse movements are tracked, which in turn demands a lower premium than a study where the participant has audio and video recorded for fifteen minutes. Even though the length of all three of these studies is the same, the more intrusive nature of tracking mouse movements, or even audio and video recording all have impacts on pricing.

Figure 15:
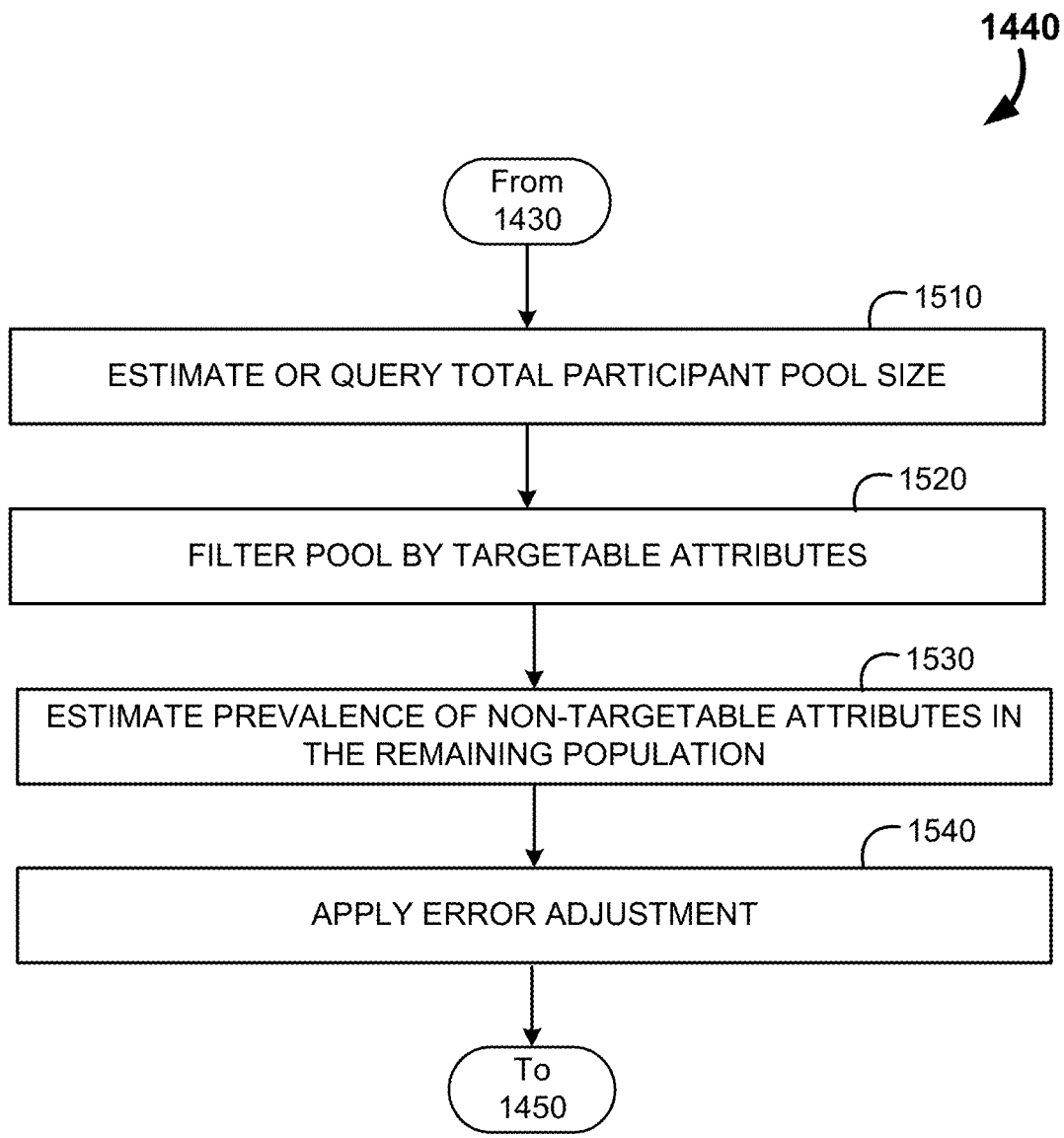
FIG. 15 is a flow diagram for the example process of pool size calculation, in accordance with some embodiment.

The next step in the process is to estimate the pool size available for the given study (at 1440). FIG. 15 provides greater detail into this estimation step. As previously noted, the total participant pool size must first be either estimated, or preferably queried directly from the panel sources (at 1510). The total pool size is then reduced to only potential participants that have the targetable attributes required for the study (at 1520). When the specific attribute is actually known, this may include a basic filtering process. More often however this process requires some degree of estimation of the prevalence of the targetable attribute in the participant pool, and extrapolating out how many individuals are likely to have the targetable attribute. Since targetable attributes are generally known in some degree of granularity in different demographic groups, this estimation may be even more refined by correlating the estimated attribute to a known attribute, or applying frequency measures in a close demographic group. Consider for example that the participant panel source at issue is based out of Sweden, and thus encompasses primarily participants from northern Europe. The attribute at issue is that the participant purchases luxury goods. The frequency of people who purchase luxury goods is a well-researched field, and thus while this specific attribute may not be known for the panel pool of participants, it may be known for American consumers as a whole, European consumers as a whole, and for western European consumers. The closest demographic to this participant group is the "western European consumers", and therefore in estimating the prevalence of this attribute, this frequency metric may be employed. However, also assume that the household income of the participant pool is an attribute that has been collected. It is known that there is a fairly strong correlation between incomes of greater than $85,000, and the individual being a purchaser of frequent luxury goods. This known correlation may be utilized as another methodology to estimate the targetable attribute in the participant population. In some cases both methods may be employed, with the results being averaged. In some cases, where the estimates differ by greater than ten percent from one another the strength of the attribute correlation may be employed to scale the estimates. Thus, extremely consistent and strong correlations will result in the estimate derived from attribute correlation to be relied upon more heavily as compared to an estimate derived from general demographic prevalence. Conversely, weaker correlations may cause the demographic frequency based estimate to be relied upon more.

After reducing the pool of possible participants by targetable attributes, a similar process may be performed based upon an estimate of the prevalence of non-targetable attributes (at 1530). As noted before, non-targetable attributes are typically extremely obscure or ephemeral, and thus cannot generally be estimated based upon demographic or correlations to other attributes. Instead, prevalence data must be acquired by sampling the participant pool, as is known in the art of statistical analysis. After the pool has thus been further narrowed, an error adjustment may be applied to the pool size based upon the confidence levels of the estimations (at 1540). For example, if the panel source is able to provide data on the number of participants, and attribute data such that there is no estimations required, the total number of available participants is fairly assured, and little or no error adjustment is required. However, if the population is determined based upon estimations of targetable attributes where the correlations are weak, and demographic frequency data is granular, then the estimate of the population size may be subject to more error. In such a case, based upon the desired business risk desired, an error adjustment may be applied to artificially reduce the population size. A smaller population will cause the price per participant to rise. As such, the error adjustment causes the overall price to increase, reducing the competitiveness of the final pricing, but conversely building in more pricing "cushion" that may result from incorrect estimates of the populations.

Returning to FIG. 14, once the potential pool of available participants has been determined, the demand curve for these participants is calculated (at 1450). From historical data, the length of the study and study type can be directly correlated to the acceptance rate of participants from different panel sources, and the attendant price charged by these panel sources. As such, a surface graph can be generated whereby the price is modeled against the number of participants needed and the time to field requirements. This curve, an example of which can be seen in FIG. 16 at 1600, is dependent upon the study length, study type, and quality threshold requirements for the participants. Additionally, macro factors, such as time of day, week, month, and/or year, weather, natural disasters, economic trends, and the like may alter the contour of the demand curve. For example, during a good economy, when the weather is good, and near a holiday weekend, there will simply be fewer participants willing to exchange their valuable time for engaging in studies. However, in less active periods, when the economy is softer (where more participants may desire to earn additional cash), and the like may increase the participation rates.

By applying the required time-to-field criteria, and the number of participants desired, the system can generate the requisite price (at 1460) to fulfill the participant sourcing needs of the usability study. As noted before, in some situations, the study requirements may simply not be able to be met. This is especially true if the attributes required by the participants are rare or specialized, and during high demand time periods. In such circumstances, a price may be generated for an altered set of study conditions (e.g., lower participant number, or longer length of time to field), and this alternative study may be presented to the study author for approval, with an explanation on why their prior study design was not possible.

Some portions of the above detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is, here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The algorithms and displays presented herein are not inherently related to any particular computer or other apparatus. Various general-purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may, thus, be implemented using a variety of programming languages.

In alternative embodiments, the machine operates as a standalone device or may be connected (e.g., networked) to other machines. In a networked deployment, the machine may operate in the capacity of a server or a client machine in a client-server network environment or as a peer machine in a peer-to-peer (or distributed) network environment.

The machine may be a server computer, a client computer, a virtual machine, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure may be implemented as part of an operating system or a specific application, component, program, object, module or sequence of instructions referred to as "computer programs." The computer programs typically comprise one or more instructions set at various times in various memory and storage devices in a computer, and when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention. It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. A method for sourcing participants for a usability study comprising:
    receiving study parameters including the type of study, time-to-field of the study, required number of participants, and required participant attributes;
    receiving a set of business rules for the study;
    querying a plurality of panel sources for potential participants and pricing data;
    selecting a subset of the panel sources responsive to the pricing data by determining an available number of participants in each panel source, calculating a pool size in each panel source of participants from the available number of participants which historically have engaged in the type of study and within the time-to-field of the study, ranking the plurality of panel sources by the pricing data, and comparing the pool size of each panel source to the required number of participants in order of the ranking until the aggregation of the pool sizes exceeds the required number of participants;
    receiving participants from the subset of the panel sources;
    fielding the participants in the study; and
    monitoring participant outcomes by inserting a virtual tracking code to a web site targeted for the study at a local machine to each participant, wherein the tracking code collects data including at least one of number of clicks, key strokes, keywords, scrolls, and time on tasks, and providing the collected data to a server for additional analysis.

2. The method of claim 1, wherein the business rules are received from a client for which the study is being performed.

3. The method of claim 1, wherein the business rules are extrapolated from a service contract with a client for which the study is being performed.

4. The method of claim 1, wherein the business rules are generated based on the monitored outcomes of sourcing of previous studies.

5. The method of claim I, further comprising filtering the plurality of panel sources based upon a minimum quality threshold.

6. The method of claim 5, wherein a quality metric for each panel source is generated by prior participation in studies responsive to timing of study tasks, red herring questions, answer consistency and answer patterns.

7. The method of claim 1, wherein the determining the available number of participants in each panel source includes determining the potential participants that have the required participant attributes.

8. The method of claim 7, wherein the determining the potential participants that have the required participant attributes includes filtering the potential participants for targetable attributes that are known, estimating not known targetable attributes by demographic frequency and known attribute correlation, and predicting non-targetable attributes using statistical sampling.

9. The method of claim 1, further comprising throttling a rate of invitations to the subset of panel sources for the participants based upon a rate of participation compared against an estimate of participation rate.

10. The method of claim 1, wherein the fielding includes providing a file of participant information to a usability testing system to alter the usability testing of the participants based upon known data.

11. An intelligent sourcing engine for sourcing participants for a usability study comprising:
- a processor in communication with non-transitory memory;
- a study database stored in the non-transitory memory containing study parameters including the type of study, time-to-field of the study, required number of participants, and required participant attributes;
- a rules database stored in the non-transitory memory containing a set of business rules for the study;
- a study estimation server stored in the non-transitory memory and when executed by the processor for querying a plurality of panel sources for potential participants and pricing data;
- a selection server stored in the non-transitory memory and when executed by the processor for selecting a subset of the panel sources responsive to the pricing data by determining an available number of participants in each panel source, calculating a pool size in each panel source of participants from the available number of participants which historically have engaged in the type of study and within the time-to-field of the study, ranking the plurality of panel sources by the pricing data and comparing the pool size of each panel source to the required number of participants in order of the ranking until the aggregation of the pool sizes exceeds the required number of participants; and
- an administration server stored in the non-transitory memory and when executed by the processor for receiving participants from the subset of the panel sources, fielding the participants in the study, and monitoring participant outcomes by inserting a virtual tracking code to a web site targeted for the study at a local machine to each participant, wherein the tracking code collects data including at least one of number of clicks, key strokes, keywords, scrolls, and time on tasks.

12. The system of claim 11, wherein the business rules are received from a client for which the study is being performed.

13. The system of claim 11, wherein the business rules are extrapolated from a service contract with a client for which the study is being performed.

14. The system of claim 11, wherein the business rules are generated based on the monitored outcomes of sourcing of previous studies.

15. The system of claim 11, wherein the selection server further filters the plurality of panel sources based upon a minimum quality threshold.

16. The system of claim 15, wherein a quality metric for each panel source is generated by prior participation in studies responsive to timing of study tasks, red herring questions, answer consistency and answer patterns.

17. The system of claim 11, wherein the determining the available number of participants in each panel source includes determining the potential participants that have the required participant attributes.

18. The system of claim 17, wherein the determining the potential participants that have the required participant attributes includes filtering the potential participants for targetable attributes that are known, estimating not known targetable attributes by demographic frequency and known attribute correlation, and predicting non-targetable attributes using statistical sampling.

19. The system of claim 11, wherein the selection server throttles a rate of invitations to the subset of panel sources for the participants based upon a rate of participation compared against an estimate of participation rate.

20. The system of claim 11, wherein the fielding includes providing a file of participant information to a usability testing system to alter the usability testing of the participants based upon known data.

* * * * *